US007438858B2

(12) United States Patent
Shvets et al.

(10) Patent No.: US 7,438,858 B2
(45) **Date of Patent: *Oct. 21, 2008**

(54) DISPENSING ASSEMBLY FOR LIQUID DROPLETS

(75) Inventors: Igor Shvets, Dublin (IE); Sergei Makarov, Dublin (IE); Juergen Osing, Dublin (IE)

(73) Assignee: The Provost Fellows and Scholars of the College of the Holy and Undivided Trinity of Queen Elizabeth near Dublin, Dublin (IE)

( * ) Notice: Subject to any disclaimer, the term of this patent is extended or adjusted under 35 U.S.C. 154(b) by 1143 days.

This patent is subject to a terminal disclaimer.

(21) Appl. No.: 10/673,408

(22) Filed: Sep. 30, 2003

(65) Prior Publication Data

US 2004/0101445 A1 May 27, 2004

Related U.S. Application Data

(63) Continuation of application No. 09/709,541, filed on Nov. 13, 2000, now Pat. No. 6,713,021.

(30) Foreign Application Priority Data

Nov. 11, 1999 (EP) .................................. 99650106

(51) Int. Cl.
*B01L 3/02* (2006.01)
*G01N 1/10* (2006.01)
*G01N 1/14* (2006.01)
*F16K 31/02* (2006.01)

(52) U.S. Cl. ....................... 422/100; 422/103; 436/180; 73/863.32; 73/863.71; 73/863.86; 73/864; 73/864.01; 73/864.02; 73/864.11; 73/864.13; 251/129.08

(58) Field of Classification Search ................. 422/100, 422/103; 436/180; 73/863.32, 863.71, 864, 73/864.01, 864.02, 864.11, 864.13, 864.34; 251/129.08, 129.18; 137/487.5
See application file for complete search history.

(56) References Cited

U.S. PATENT DOCUMENTS 4,181,130 A 1/1980 Bailey (Continued)

FOREIGN PATENT DOCUMENTS

GB 1520606 8/1978

(Continued)

*Primary Examiner*—Brian R. Gordon
(74) *Attorney, Agent, or Firm*—Birch Stewart Kolasch & Birch, LLP

(57) ABSTRACT

A dispensing assembly for liquid droplets that includes a dispenser connected to a liquid carrying pipe which in turn is connected to a source of pressurized liquid. The dispenser has an elongated body member having a main bore connected to the liquid carrying pipe. At the other end, the main bore has a valve seat that is connected to a nozzle having a nozzle bore terminating in a dispensing tip. An elongated valve boss of ferromagnetic material covered with a soft polymer is mounted in the main bore and has a cross-sectional area less than that of the main bore. A separate valve boss actuating coil assembly has upper and lower coils that are separate from the main body that can be unplugged from both coils and from the liquid carrying pipe. As such, the main body can be a disposable member.

52 Claims, 34 Drawing Sheets

U.S. PATENT DOCUMENTS

| | | | |
|---|---|---|---|
| 4,229,413 | A | 10/1980 | Marteau d'Autry |
| 4,302,166 | A | 11/1981 | Fulwyler et al. |
| 4,541,787 | A | 9/1985 | DeLong |
| 4,574,850 | A | 3/1986 | Davis |
| 4,956,128 | A | 9/1990 | Hommel et al. |
| 5,035,150 | A | 7/1991 | Tompkins |
| 5,115,131 | A | 5/1992 | Jorgenson et al. |
| 5,491,500 | A | 2/1996 | Inui et al. |
| 5,508,726 | A | 4/1996 | Sugahara |
| 5,525,515 | A | 6/1996 | Blattner |
| 5,527,295 | A | 6/1996 | Wing |
| 5,559,339 | A | 9/1996 | Domanik et al. |
| 5,639,467 | A | 6/1997 | Dorian et al. |
| 5,741,554 | A | 4/1998 | Tissone |
| 5,744,099 | A | 4/1998 | Chase et al. |
| 5,758,666 | A | 6/1998 | Larson, Jr. et al. |
| 5,891,212 | A | 4/1999 | Tang et al. |
| 5,916,524 | A | 6/1999 | Tisone |
| 6,063,339 | A | 5/2000 | Tisone et al. |
| 6,116,269 | A | 9/2000 | Maxson |
| 6,133,044 | A | 10/2000 | Van den Engh |
| 6,135,325 | A | 10/2000 | Fessel et al. |
| 6,223,761 | B1 | 5/2001 | Najmolhoda et al. |
| 6,293,514 | B1 | 9/2001 | Pechoux et al. |
| 6,378,545 | B1 | 4/2002 | Bozkan et al. |
| 6,394,415 | B1 | 5/2002 | Ohmi et al. |
| 6,416,718 | B1 | 7/2002 | Maiefski et al. |
| 6,422,259 | B1 | 7/2002 | Moreno |
| 6,537,505 | B1 | 3/2003 | LaBudde et al. |
| 6,543,744 | B2 | 4/2003 | Carrillo et al. |
| 6,713,021 | B1 * | 3/2004 | Shvets et al. ................ 422/100 |
| 2001/0004449 | A1 | 6/2001 | Suzuki et al. |
| 2001/0016358 | A1 | 8/2001 | Osawa et al. |
| 2001/0052585 | A1 | 12/2001 | Righolt et al. |
| 2002/0088493 | A1 | 7/2002 | Suzuki |
| 2002/0117644 | A1 | 8/2002 | Carrillo et al. |
| 2002/0131903 | A1 | 9/2002 | Ingenhoven et al. |

FOREIGN PATENT DOCUMENTS

| | | |
|---|---|---|
| WO | 9852640 | 11/1998 |
| WO | 9942752 | 8/1999 |

* cited by examiner

Fig. 34
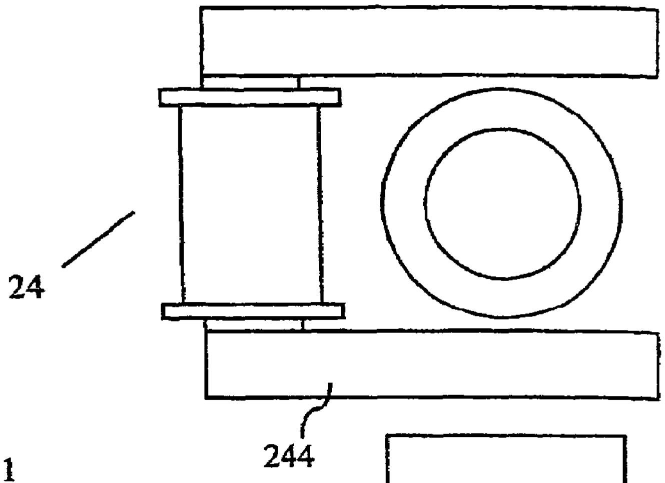
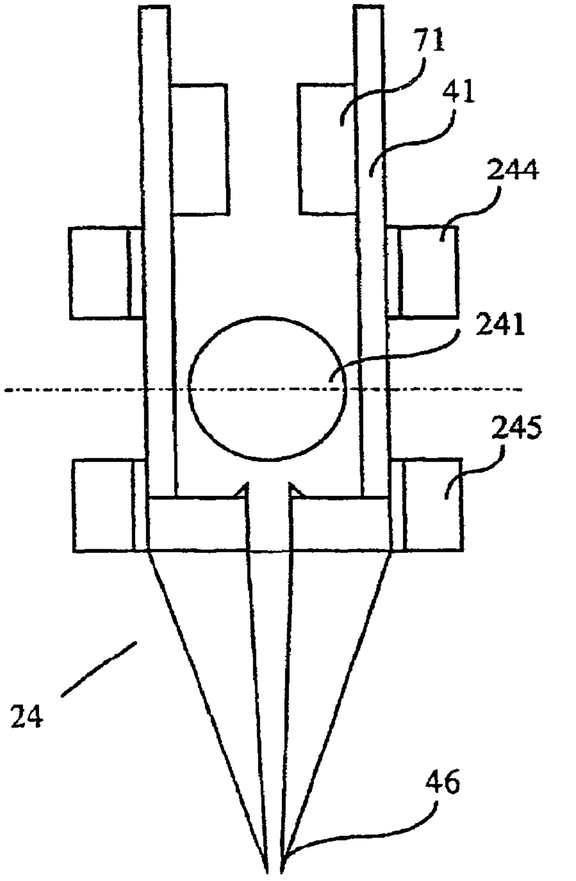
Fig. 35
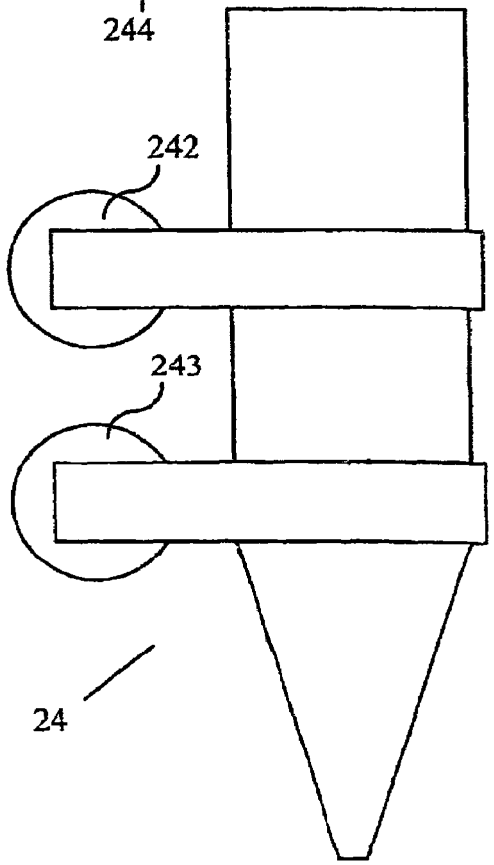
Fig. 33

Fig. 37
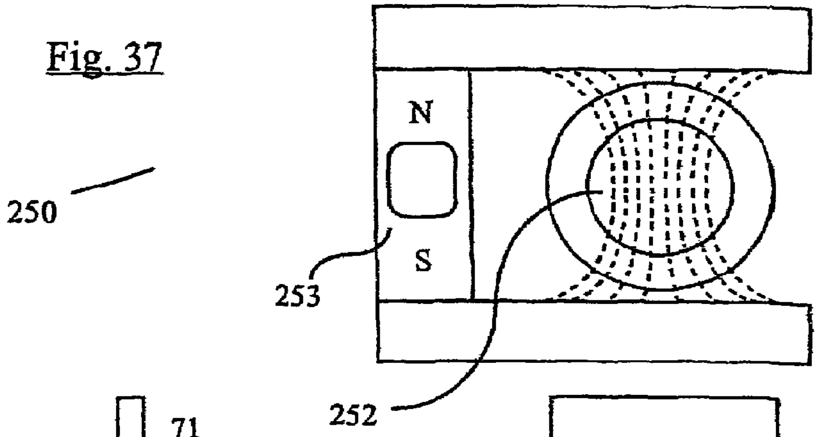
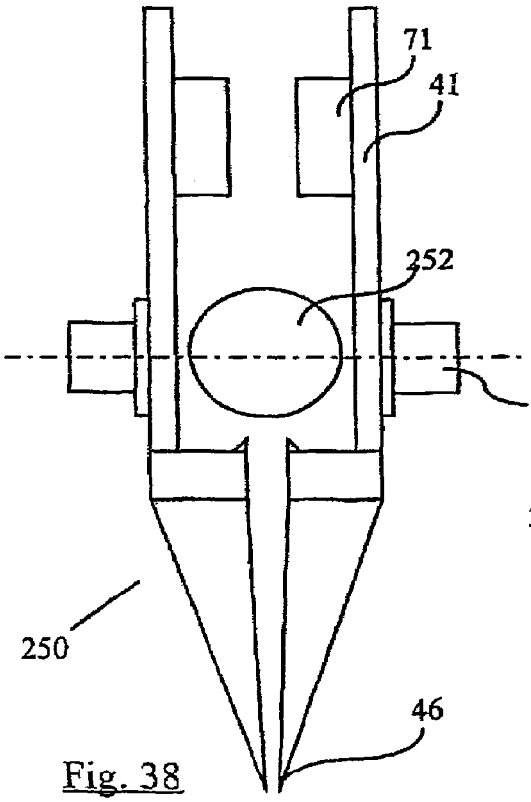
Fig. 38
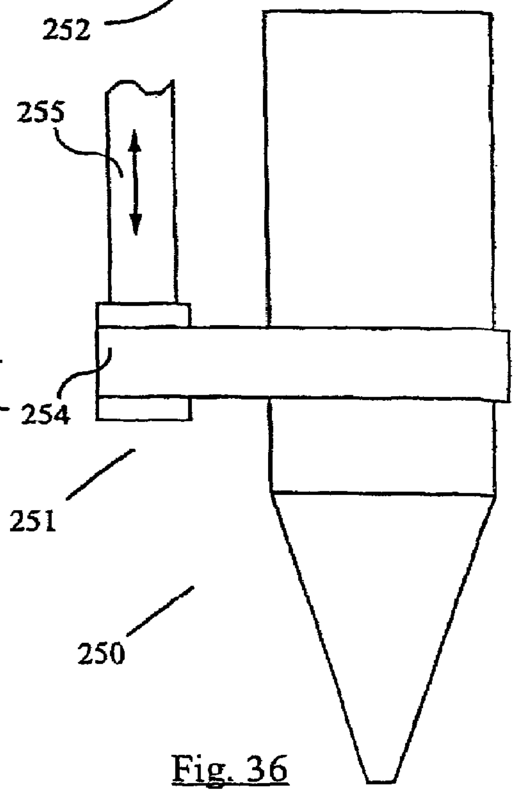
Fig. 36

DISPENSING ASSEMBLY FOR LIQUID DROPLETS

This is a continuation of U.S. application Ser. No. 09/709,541, now U.S. Pat. No. 6,713,021 filed on Nov. 13, 2000.

INTRODUCTION

The present invention relates to a dispensing assembly for liquid droplets of the type comprising a dispenser, having a main bore communicating with the nozzle having a nozzle bore terminating in a dispensing tip and delivery means for moving liquid to the dispenser and from there through the bore to form a droplet on the exterior of the tip and then to cause a droplet to fall off therefrom. The invention is further concerned with a method of dispensing a droplet from a pressurised liquid delivery source through a metering valve dispenser comprising an elongate body member having a main bore communicating through a valve seat with a nozzle having a nozzle bore terminating in a dispensing tip, a separate floating valve boss of magnetic material housed in the body member, the cross sectional area of which is sufficiently less than that of the main bore to permit the free passage of liquid therebetween thus by passing the valve boss; and a separate valve boss actuating coil assembly surrounding the body member.

BACKGROUND OF THE INVENTION

The present invention is generally related to liquid handling systems and in particular to systems for dispensing and aspirating of small volumes of reagents. It is particularly directed to a high throughput screening, polymerase chain reaction (PCR), combinatorial chemistry, microarraying, medical diagnostics and others. In the area of high throughput screening, PCR and combinatorial chemistry, the typical application for such a fluid handling system is in dispensing small volumes of the reagents, e.g. 1 ml and smaller and in particular volumes around 1 microliter and smaller. It is also directed to the aspiration of volumes from sample wells so that the reagents can be transported between the wells. The invention relates also to microarray technology, a recent advance in the field of high throughput screening. Microarray technology is being used for applications such as DNA arrays. In this technology the arrays are created on glass or polymer slides. The fluid handling system for this technology is directed to dispensing consistent droplets of reagents of sub-microliter volume.

Development of instrumentation for dispensing of minute volumes of liquids has been an important area of technological progress for some time. Numerous devices for controlled dispensing of small volumes of liquids (in the range of 1 μl and smaller) for ink jet printing application have been developed over the past twenty five years. More recently, a wide range of new areas of applications has emerged for devices handling liquids in the low microliter range. These are discussed for example in "analytical chemistry" [A. J. Bard, Integrated chemical systems, Wiley-Interscience Pbl, 1994], and "biomedical applications [A. G. Graig, J. D. Hoheeisel, Automation, Series Methods in Microbiology, vol 28, Academic Press, 1999].

The present invention is also directed to medical diagnostics e.g. for printing reagents on a substrate covered with bodily fluids for subsequent analysis or alternatively for printing bodily fluids on substrates.

The requirements of a dispensing system vary significantly depending on the application. For example, the main requirement of a dispensing system for the ink jet applications is to deliver droplets of a fixed volume with a high repetition rate. The separation between individual nozzles should be as small as possible so that many nozzles can be accommodated on a single printing cartridge. On the other hand in this application the task is simplified by the fact that the mechanical properties of the liquid dispensed namely ink are well defined and consistent. Also in most cases the device used in the ink jet applications does not need to aspire the liquid through the nozzle for the cartridge refill.

For biomedical applications such as High Throughput Screening (HTS) the requirements imposed on a dispensing system are completely different. The system should be capable of handling a variety of reagents with different mechanical properties e.g. viscosity. Usually these systems should also be capable of aspiring the reagents through the nozzle from a well. On the other hand there is no such a demanding requirement for the high repetition rate of drops as in ink jet applications. Another requirement in the HTS applications is that cross contamination between different wells served by the same dispensing device be avoided as much as possible.

The most common method of liquid handling for the HTS applications is based on a positive displacement pump such as described in U.S. Pat. No. 5,744,099 (Chase et al). The pump consists of a syringe with a plunger driven by a motor, usually a stepper or servo-motor. The syringe is usually connected to the nozzle of the liquid handling system by means of a flexible polymer tubing The nozzle is typically attached to an arm of a robotic system which carries it between different wells for aspiring and dispensing the liquids. The syringe is filled with a liquid such as water. The water continuously extends through the flexible tubing into the nozzle down towards the tip. The liquid reagent which needs to be dispensed, fills up into the nozzle from the tip. In order to avoid mixing of the water and the reagent and therefore cross-contamination, an air bubble or bubble of another gas is usually left between them. In order to dispense the reagent from the nozzle, the plunger of the syringe is displaced. Suppose this displacement expels the volume ΔV of the water from the syringe. The front end of the water filling the nozzle is displaced along with it. The water is virtually incompressible. If the inner volume within the flexible tubing remains unchanged, then the volume ΔV displaced from the syringe equals the volume displaced by the moving front of the water in the nozzle. If the volume of the air bubble is small it is possible to ignore the variations of the bubble's volume as the plunger of the syringe moves. Thus the back end of the reagent is displaced by the same volume ΔV in the nozzle, and therefore the volume ejected from the tip is the same ΔV. This is the principle of operation of such a pump. The pump works accurately if the volume ΔV is much greater than the volume of the air bubble. In practice the volume of the air bubble changes as the plunger of the syringe moves. Indeed in order to eject a drop from the tip, the pressure in the tubing should exceed the atmospheric pressure by an amount determined by the surface tension acting on the drop before it detaches from the nozzle. Therefore at the moment of ejection the pressure in the tubing increases and after the ejection, it decreases. As common gasses are compressible, the volume of the air or gas bubble changes during the ejection of the droplet and this adds to the error of the accuracy of the system. The smaller the volume of the air bubble, the smaller is the expected error. In other words the accuracy is determined significantly by the ratio of the volumes of the air bubble and the liquid droplet. The smaller this ratio is the better the accuracy. For practical reasons it is difficult to reduce the volume of the air or gas bubble to below some one or two microliters and usually it is considerably greater than this. Therefore, this method with two liquids separated by an air or gas bubble and based on a positive displacement pump is not well suited for dispensing volume as low as 1 microliter or lower. There are also additional limitations on accuracy when submicroliter volumes need to be dispensed. For example, as the arm of the robotic system moves over the target wells, the flexible tubing filled with the water bends and consequently its inner volume changes. Therefore, as the arm moves, the front end of the water in the nozzle moves to some extent even if the plunger of the syringe does not. This adds to the error of the volume dispensed. Other limitations are discussed in Graig et al referred to above. Examples of such positive displacement pumps are shown in U.S. Pat. No. 5,744,099 (Chase et al). Similarly the problems of dispensing drops of small volume are also described and discussed in U.S. Pat. No. 4,574,850 (Davis) and U.S. Pat. No. 5,035,150 (Tomkins).

U.S. Pat. No. 5,741,554 (Tisone) describes another method of dispensing small volumes of fluids for biomedical application and in particular for depositing the agents on diagnostic test strips. This method combines a positive displacement pump and a conventional solenoid valve. The positive displacement pump is a syringe pump filled with a fluid to be dispensed. The pump is connected to a tubing. At the other end of the tubing there is a solenoid valve located close to the ejection nozzle. The tubing is also filled with the fluid to be dispensed. In this method the piston of the pump is driven by a motor with a well defined speed. This speed determines the flow rate of the fluid from the nozzle provided the solenoid valve is opened frequently enough and the duty cycle open/close of the valve is long enough. The solenoid valve is actuated with a defined repetition rate. The repetition rate of the valve and the flow rate of the pump determine the size of each drop. For example, if the pump operates at a flow rate of 1 μl per second and the repetition rate is 100 open-close cycles per second, then the size of each drop is 10 nl. However, for dispensing of submicroliter volumes for HTS applications this method is often inappropriate since it is required to aspire fluid through the nozzle in small quantities and then dispense it in fractions of this quantity. To avoid mixing of the fluid aspired with the one in the syringe pump, it is probably necessary to place a bubble of gas in the tube with the attendant problems described above. While this type of pump and solenoid valve is designed for dispensing series of drops of consistent size, it may not be well suited for dispensing single drops i.e. one drop on demand which is exactly the mode of dispensing used in the HTS applications. If the solenoid valve open time and/or operating frequency are too small for a given pump flow rate, the pressure in the dispenser will become too great, causing possible rupture or malfunctioning of the system.

U.S. Pat. No. 5,758,666 (Carl O. Larson, Jr. et al) describes a surgically implantable reciprocating pump having a floating piston made of a permanent magnetic material and incorporating a check valve. The piston can be moved by means of energising the coils in a suitable timing sequence. The piston allows the flow of liquid through it when it moves in one direction as the check valve is open and when it moves in the opposite direction, the check valve is closed and the liquid is pumped by the piston.

U.S. Pat. No. 4,541,787 (Sanford D. DeLong) describes an electromagnetic reciprocating pump with a "magnetically responsive" piston as it contains some ferromagnetic material. The piston is actuated by at least two coils located outside the cylinder containing the piston. The coils are energised by a current with a required timing.

Drops of microliter volume and smaller can be also generated by the method of electrospray which is mainly used for injection of a fluid into a chemical analysis system such as a mass spectrometer. In most cases the desired output of electrospray is not a stream of small drops but rather of ionised molecules. The method is based on supplying a liquid under pressure through a capillary towards its end and then a strong electrostatic field is generated at the end of the capillary by applying a high voltage, typically over 400V, between the end of the capillary and a conductor placed close to it. A charged volume of fluid at the end of the capillary is repelled from the rest of the capillary by Coulomb interaction as they are charged with the like charges. This forms a flow of charged particles and ions in the shape of a cone with the apex at the end of the capillary. A typical electrospray application is described in U.S. Pat. No. 5,115,131 (James W. Jorgenson et al).

There are inventions where the droplets emitted from a capillary are charged in order to prevent them from coming together with coagulation. This approach is described in U.S. Pat. No. 5,891,212 (Jie Tang et al) for fabrication of uniform charged spheres. U.S. Pat. No. 4,302,166 (Mack J. Fulwyler et al) teaches how to handle uniform particles each containing a core of one liquid and a solidified sheath. In this invention the electric field is applied in a similar way to keep the particles away from each other until the sheath of the particles has solidified. In this invention the particles are formed from a jet by applying a periodic disturbance to the jet. U.S. Pat. No. 4,956,128 (Martin Hommel et al) teaches how to dispense uniform droplets and convert these into microcapsules. A syringe pump supplies the fluid into a capillary. A series of high voltage pulses is applied to the capillary. The size of the droplets is determined by the supply of fluid through the capillary and the repetition rate of the high voltage pulses. The patent discusses generation of a single drop on demand. U.S. Pat. No. 5,639,467 (Randel E. Dorian et al) teaches a method of coating of substrates with a uniform layer of biological material. A droplet generator is employed which consists of a pressurised container connected to a capillary. A high constant voltage is applied between the capillary and the receiving gelling solution.

There are numerous methods for ink jet dispensing. The ink jet printing industry is the main driving force in the continuing progress in this field. Some of the well known methods are listed below:

a) One of the oldest methods of creating separated and uniform droplets is based on breaking a jet of liquid emerging from the nozzle. To control the breaking up of the jet into separated droplets periodical vibrations are applied to the jet of liquid. The optimal frequency F of such vibrations was estimated by Lord Rayleigh over a hundred years ago:

$$F = \frac{V}{4.51d}$$

where

V—emerging jet velocity d—jet diameter.

All droplets at this frequency are created uniformly with the same volume. A typical example of implementation of this method can be found in U.S. Pat. No. 5,741,554 (Tissone).

b) In numerous implementations of ink jet printing, pressure waves inside a liquid-holding chamber are created by a piezoelectric actuator. Accelerated by pressure waves, the liquid in the chamber achieves sufficient speed to move through the nozzle and to overcome capillary forces at the tip. In such a case a small droplet will be formed.

c) According to one method, the piezoelectric transducer changes the volume of the container and creates pressure waves in the liquid in the container. The action of compression wave causes some amount of the liquid (ink) to go through the nozzle and to form droplets which are separated from the bulk liquid in the container, see for example U.S. Pat. No. 5,508,726 (Sugahara).

d) In U.S. Pat. No. 5,491,500 (Inui) an ink jet head is described where liquid in the printing head is "pushed" by progressive waves created by a synchronized row of piezoelectric devices. Eventually, liquid in the printing head obtains enough speed to spray sequences of droplets through the nozzle.

In the methods b) to d) listed above it is necessary to have liquid without vapor and bubbles. Droplet viscosity, surface tension are very important. In the b) and c) cases droplets can be only of a fixed size.

In summary, the most common method of handling reagents used in HTS applications is based on a positive displacement pump and a gas bubble. The problem is that when dispensing volumes of reagents around 1 microliter or smaller the variation in the volume of the bubble during the dispensation compromises the accuracy. It has been found difficult to eject small droplets of precisely required volume using this method.

The use of a solenoid valve has two main disadvantages when used for HTS applications. The first one is the relatively high cost of a solenoid valve such that it cannot be a disposable element and thus cross contamination can be a major problem. Further difficulties have been experienced in achieving dead volumes smaller than 1 to 2 microliters in a conventional solenoid valve.

Piezo dispensers while used are often not well suited for dispensing reagents for medical applications. The reason is that the piezo dispenser commonly requires that fluid to be dispensed has well defined and consistent properties. Unfortunately, reagents and bodily fluids used in medical and biomedical applications have broadly varying properties and often contain particles and inhomogenities which can block the nozzle of the piezo dispenser.

As the size of wells becomes smaller and smaller, the problem of missing the correct well or dropping the liquid reagent at the wrong place of the substrate on which the reagent is being deposited becomes more and more significant. Measurement of the volume of the drops dispensed in the submicroliter range is a formidable task. It would be a highly desired and valuable feature of a liquid handling instrument to be capable of measurement of volume of individual droplets especially in the submicroliter range, and also measurement of the dispensation event which will allow excluding missing a drop.

U.S. Pat. No. 5,559,339 (Domanik) teaches a method for verifying a dispensing of a fluid from a dispense nozzle. The method is based on coupling of electromagnetic radiation which is usually light from a source to a receiver. As a droplet of fluid travels from the nozzle it obstructs the coupling and therefore the intensity of the signal detected by the receiver is reduced. The mechanism of such an obstruction is absorption of electromagnetic radiation by the droplet. The disadvantage of this method is that the smaller the size of the droplet, the smaller is the absorption in it. Almost certainly the method should not work for fluids which do not absorb the radiation.

For a range of applications such as high through put screening where minute droplets of fluids with a broad range of optical properties need to be dispensed the methods disclosed in this specification are inappropriate. Further the specification acknowledges that it will only operate satisfactorily with major droplets.

OBJECTS OF THE INVENTION

The present invention is directed towards providing an improved method and apparatus for dispensing of volumes of liquids as small as 10 nl=$10^{-8}$l or even smaller, while at the same time it should be possible to dispense larger droplets such as those as large at 10 microliters or even greater.

Another objective is to provide a method where the quantity of the fluid dispensed can be freely selected by the operator and accurately controlled by the dispensing system. The system should be capable of dispensing e.g. a 10 nl drop followed by a 500 nl one in comparison to for example ink jet printing where the volume of one dispensation is fixed, and dispensations are only possible in multiples of this quantity.

The invention is also directed towards providing a method where the fluid can be dispensed on demand, i.e. one quantity can be dispensed at a required time as opposed to a series of dispensations with periodic time intervals between them. Yet, the method should also allow for dispensation of doses with regular intervals between subsequent dispensations, for example, printing with reagents.

Another objective of the present invention is to provide a method and a device suitable for dispensing a fluid from a supply line to a sample well and also for aspiring a fluid from the sample well into the supply line. The device should be able to control accurately the amount of the fluid aspired into the nozzle of the dispenser from a supply well.

Another objective is to provide a low cost front end of the dispensing device called herein the dispenser which could be disposed of when it becomes contaminated namely the part which comes in direct contact with the reagents dispensed. It is an important objective of the invention to provide a dispenser such that the disconnection and replacement is achieved simply such as by an arm of a robot.

Another objective is to provide a method for handling fluids in a robotic system for high throughput screening or microarraying which would be suitable for accurate dispensing and aspiring volumes smaller than the ones obtainable with current positive displacement pumps.

Yet another objective is to provide means of more accurate delivery of a drop of liquid reagent to a correct target well on a substrate and also to improve the accuracy of delivery of the drop to a correct location in a well forming part of a receiving substrate. Yet another objective is to provide means for directing the doses of fluids into different wells of a sample well plate and means of controlling the delivery address of the dose on the sample well plate to speed up the liquid handling procedure.

Yet another objective of the invention is to reduce "splashing" as the drop arrives at the well.

Another objective of the invention is to provide information if the drop was dispensed or not. It is additional an objective to measure the volume of the drop which was dispensed.

SUMMARY OF THE INVENTION

According to the invention there is provided a dispenser for discrete droplets of less than ten microliters (10 μl) in volume of a liquid comprising:

(A) a main assembly;

(B) a liquid container comprising:

an elongated body member having a straight main bore;

an inlet to the main bore;

a valve seat in the body member forming a main bore outlet remote from and substantially in line with the inlet;

a nozzle mounted on the body member and having a nozzle bore communicating with the valve seat;

a droplet dispensing tip on the nozzle remote from the valve seat;

a separate elongated floating valve boss of magnetic material loosely mounted in the main bore for limited movement out of line with the main bore, its cross-sectional area relative to that of the main bore being such as to permit the free flow of liquid between the main bore inlet and outlet by passing the valve boss, said valve boss not being mechanically connected to the body member;

(C) means for releasably securing the liquid container to the main assembly;

(D) means for exerting a pressure differential on the liquid in the dispenser; and (E) a separate valve boss actuating assembly adjacent the body member for applying an electromagnetic force to the valve boss to engage and disengage the valve boss from the valve seat.

The invention is particularly directed towards the dispensing of droplets within the range 1 nanoliter (1 nl) to 10 microliters (10 μl). The smaller the droplet, the more difficult the dispensing becomes.

This has major advantages in that the dispensing assembly does not rely on a positive displacement pump, or any other pressurised source for the actual delivery, it uses what is effectively a solenoid valve, but a solenoid valve that is not of conventional construction. All it needs is a pressurised liquid delivery which can be any form of pressurised liquid delivery such as a positive displacement pump which functions as a source of pressure, not a metering device. It is important to appreciate that there is no mechanical connection between the valve boss and the other parts of the dispenser. There are no springs, nor any other mechanical actuation means. In fact there is virtually no dead volume in the dispenser. It will also be appreciated that the dispenser is effectively separate from the actuating coils so that a very low cost dispenser can be used which will allow easy removal. A major feature of the invention is that the elongated body member of the dispenser is effectively disposable.

In one embodiment of the invention the valve boss is of a hard magnetic material and indeed with this latter embodiment ideally the valve boss is biased to a closed position into engagement with the valve seat by an external magnetic field generated by the actuating coil assembly. This is in direct contradiction to more conventional solenoid valves, where the plunger is usually of a soft magnetic material. It has been found that for dispensing minute volumes the force that can be exerted by the valve boss by a current coil is greater with a hard magnetic material and thus the valve boss moves quicker and greater accuracy of dispensing is achieved. With a hard magnetic material only one coil is necessary as all that is required is to reverse the direction of the current to open and close the valve.

Ideally the valve boss is covered with a layer of a soft polymer material. This will ensure that there is a good seal at the valve seat. Alternatively the value boss may be made from flexible bonded magnetic material In one embodiment of the invention the actuating coil assembly comprises two separate sets of coils for moving the boss in opposite directions within the body member. Two coils are obviously necessary when the valve boss is made of a soft magnetic material.

Ideally the valve boss, the body member and nozzle form the one separate sub assembly releasably detachable from the remainder of the dispenser. This provides greater disposability and, with greater disposability cross-contamination may be effectively eliminated which is of paramount importance for medical and biological applications.

In one embodiment of the invention the actuating coil assembly comprises a source of electrical power and a controller for varying the current over time as each droplet is being dispensed. Varying the current ensures that the peak current is supplied when required i.e. when actually opening and closing the valve, while by varying the current and only using the highest current when required, overheating is prevented and as will be appreciated the use of current of a higher current value when required is acceptable and useful.

In one embodiment of the invention the elongated valve boss is in the form of a cylindrical plug having radially extending circumferential fins whereby on movement of the boss towards the valve seat liquid is urged into the nozzle bore and onto the tip. This ensures even more positive displacement of the liquid into the nozzle bore and thus more positive dispensing of the droplets. Such materials can either have hard or soft magnetic properties and if they are of a relatively soft polymer material they can improve the performance of the seal.

Ideally the body member and the nozzle form an integral moulding of plastics material and integral moulding is relatively inexpensive and further improves disposability.

In one embodiment of the invention there is provided a dispensing assembly comprising:

an electrode incorporated in the dispensing tip;

a separate receiving electrode remote from the tip; and a high voltage source connected to one of the electrodes to provide an electrostatic field therebetween.

It is often advantageous to decrease the pressure in the line connected to the dispenser as this will allow much easier pressure tight connections to be made and thus advantageously increase the disposability and replaceability of parts of the dispenser. Further because of the use of lower pressures the droplets are now ejected at lower speed at these lower pressures so that splashing is minimised. The electrostatic field still allows the dispenser to operate.

Ideally the receiving electrode is below the dispensing tip and a droplet receiving substrate may be mounted between the receiving electrode and the dispenser tip, or mounted below the receiving electrode, the receiving electrode in the latter case having at least one hole for the droplet to pass through to the receiving substrate. Indeed there may be a plurality of receiving electrodes at least one of which is activated at any one time. All of these improve the accuracy and control of the dispensing.

Ideally synchronous indexing means may be provided for the dispenser and/or the receiving electrode for accurate deployment of droplets on the substrate.

In one embodiment of the invention there is more than one receiving electrode forming droplet deflection electrodes which are mounted below the dispensing tip and above the droplets receiving substrate and in which the high voltage source has control means to vary the voltage applied to the deflection electrodes. All of these further improve the accuracy of the guidance of the droplets onto the receiving substrate. This has become particularly important with the miniaturisation of substrates since it becomes increasingly difficult to ensure that the droplet reaches its correct destination.

In one embodiment of the invention there is provided a detector for sensing the separation of the droplet from the dispensing tip. In a particularly preferred example of this latter embodiment, the detector comprises:

a source of electromagnetic radiation;

means for focussing the radiation on the end of the dispensing tip; and means for collecting the radiation transmitted by a droplet on the dispensing tip. Preferably this is reflected or refracted radiation.

In many instances it is necessary to ensure that a droplet did indeed get dispensed.

In some of these embodiments the source of radiation is mounted within the dispenser nozzle.

Ideally means are provided for measuring the charge of the droplet which can be conveniently done in a Faraday Pail which can have a bottom or may be bottomless. This will allow both the charge and mass of the droplet to be ascertained and in particular when using the bottomless Faraday Pail the actual mass of the droplet can be ascertained without loss of liquid.

Further the invention provides a dispenser for discrete droplets of less than ten microliters (10 μl) in volume of a liquid comprising:

(A) a main assembly;

(B) a liquid container comprising:

an elongated body member having a straight main bore;

an inlet to the main bore;

a valve seat in the body member forming a main bore outlet remote from and substantially in line with the inlet;

a nozzle mounted on the body member and having a nozzle bore communicating with the valve seat;

a droplet dispensing tip on the nozzle remote from the valve seat;

a separate elongated floating valve boss of hard magnetic material magnetised along its longitudinal axis loosely mounted in the main bore for limited movement out of line with the main bore, its cross-sectional area relative to that of the main bore being such as to permit the free flow of liquid between the main bore inlet and outlet by passing the valve boss, said valve boss not being mechanically connected to the body member;

(C) means for releasably securing the liquid container to the main assembly;

(D) means for exerting a pressure differential on the liquid in the dispenser;

(E) a separate valve boss actuating assembly adjacent the body member for applying an electromagnetic force to the valve boss to engage and disengage the valve boss from the valve seat;

(F) an electrode incorporated in the dispensing tip;

(G) a separate receiving electrode remote from the tip; and (H) a high voltage generating means generating means connected to one of the electrodes to provide an electrostatic field therebetween.

Further the invention provides a method of dispensing a droplet having a volume less than ten micro liters (10 μl) from a pressurised liquid delivery source through a metering valve dispenser comprising an elongate body member having a main bore communicating through a valve seat with a nozzle having a nozzle bore terminating in a dispensing tip, a separate floating valve boss of magnetic material housed in the body member, the cross sectional area of which is sufficiently less than that of the main bore to permit the free passage of liquid therebetween thus bypassing the valve boss; and a separate valve boss actuating coil assembly surrounding the body member, comprising the steps of:

delivering the pressurised liquid to the dispenser;

opening the valve by actuating the coil assembly for a preset time to deliver liquid around the valve boss into the nozzle bore; and closing the valve as the droplet falls off.

In this latter method, the step may be performed of the valve being shut off of generating a pulse of voltage at a receiving electrode remote from the dispensing tip to generate an electrostatic field to cause an electrostatic potential between the droplet and the receiving electrode to detach it from the dispensing tip. This will allow the liquid to be pressurised at less than 4 or even 2 bar.

In this latter method the receiving electrode may be mounted beneath a droplet receiving substrate and the nozzle, or between a droplet receiving substrate and the nozzle. In either of these methods the electrode could move after each droplet is dispensed to direct the next droplet to another position on the substrate and further in any of these methods spaced apart deflection electrodes may be placed around the dispensing tip and a droplet receiving substrate and the electrodes are differentially charged to cause the droplet to move laterally as it drops from the dispensing trip. This ensures accurate placement of droplets on substrates. Indeed the deflection electrodes can be placed in many suitable places above or below the substrate all that is required is to deflect the droplet.

Further the invention provides a method comprising the steps of:

measuring the volume of a droplet of a particular liquid for different drop off voltages;

storing a database of the measurements;

recording the drop off voltage when a droplet detaches from the dispensing tip; and retrieving the volume from the database.

This is a particularly suitable way of calibrating the device.

Preferably the drop off voltage is measured by a Faraday Pail.

When it is desired to record the drop-off of a droplet, this invention provides a method of so-doing which includes the steps of:

directing an electromagnetic beam from a source of electromagnetic radiation at the droplet as it forms at the tip; and monitoring the electromagnetic radiation coupled by the droplet at a collector remote from the droplet.

In this latter method the light beam may be the source of electromagnetic radiation and the amount of light reflected and/or refracted by the droplet is monitored. This is a particularly convenient and relatively inexpensive way of providing the source of radiation.

In one method according to the invention the steps are performed of:

measuring the charge of droplets of a particular liquid for different volumes of droplets;

storing a database of the measurements;

recording the charge on each droplet; and retrieving the volumes from the database.

This is a very suitable way of obtaining the mass and volume of the various liquids being dispensed.

A particularly suitable way of carrying out this method is by:

measuring the width of the voltage pulse in a Faraday pail;

determining the time taken for the droplet to pass through the pail;
deriving the speed of the droplet from the time taken to pass through the pail; and
calculating the mass of the droplet from the charge to mass ratio.

The great advantage of using a Faraday Pail is that there is no destruction or loss of any of the droplets.

BRIEF DESCRIPTION OF THE DRAWINGS

The invention will be more clearly understood from the following description of some embodiments thereof given by way of example only with reference to the accompanying drawings in which:

FIG. 33 is a side view of an alternative construction of dispenser;

FIG. 34 is a plan view of the dispenser of FIG. 33;

FIG. 35 is a sectional view of the dispenser of FIG. 33;

FIG. 36 is a side view of a still further dispenser;

FIG. 37 is a plan view of the dispenser of FIG. 36; and

FIG. 38 is a sectional view of the dispenser.

DETAILED DESCRIPTION OF THE PREFERRED EMBODIMENTS

Figure 1:
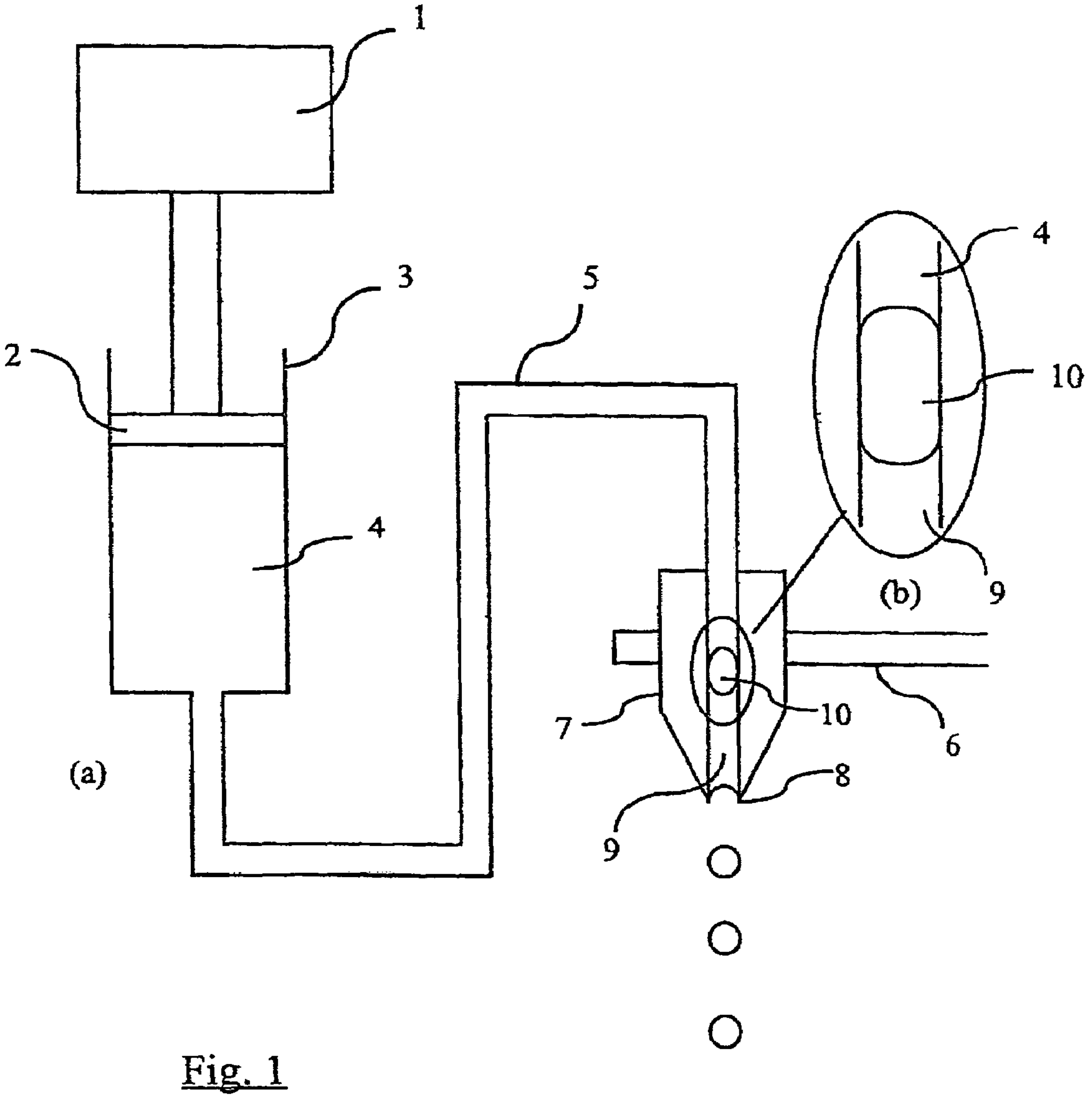
FIGS. 1(*a*) and (*b*) are diagrammatic views of a positive displacement pump arrangement of the prior art.

Referring to the drawings and initially to FIGS. 1(*a*) and (*b*) there is illustrated the prior art showing a conventional method of liquid droplet production using a positive displacement pump. There is illustrated a motor 1 driving a piston 2 of a positive displacement pump 3 containing water 4 connected by flexible tubing 5 to a robotic arm 6 carrying a nozzle 7 having a tip 8 into which the tubing 5 projects. A reagent 9 is contained in the nozzle 7 adjacent to the tip 8 and separated from the water 4 by a gas bubble 10 see FIG. 1(*b*). The motor 1 which is usually a stepper or servo motor will each time move the piston 2 to dispense reagent.

Figure 2:
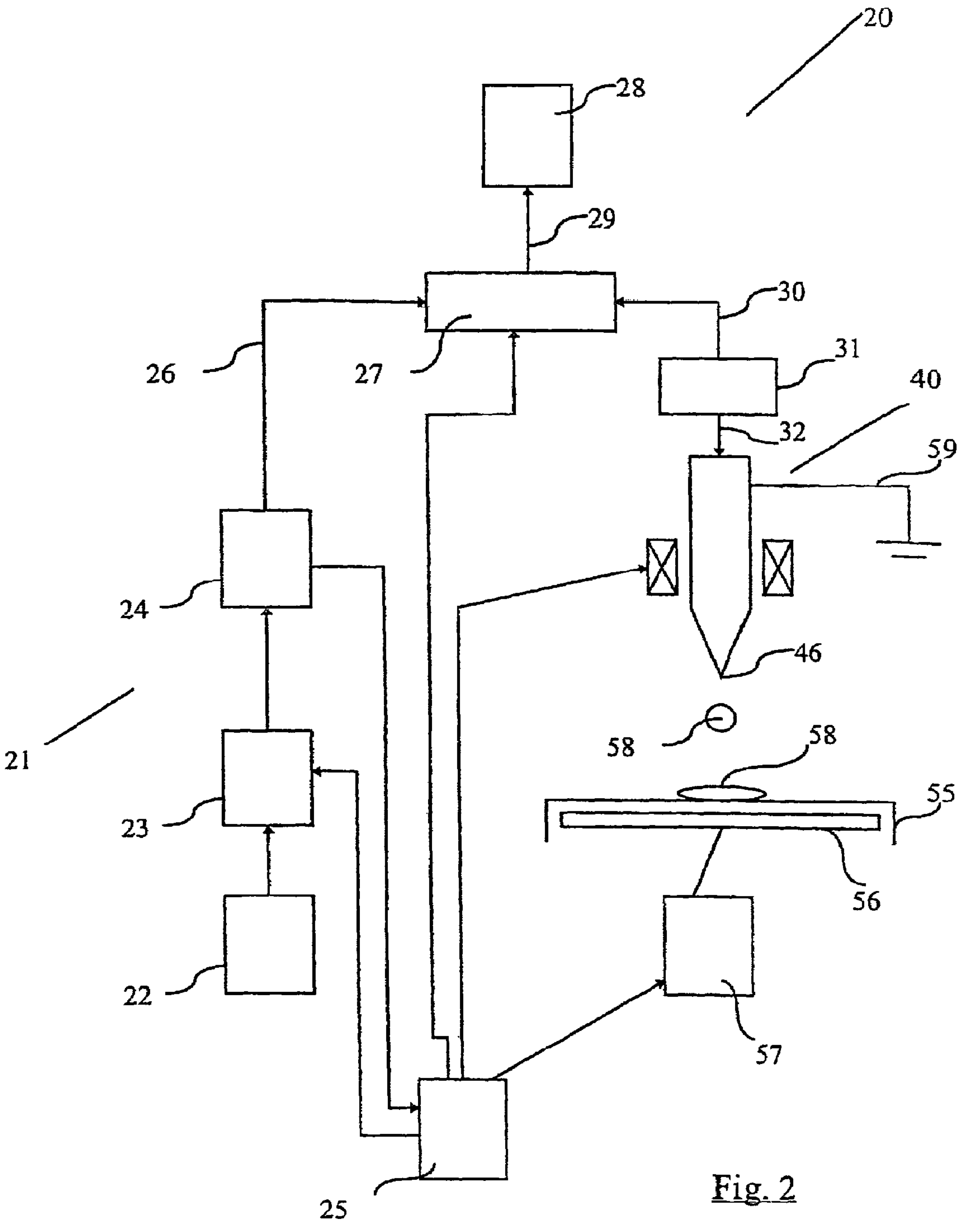
FIGS. 2 and 3 are diagrammatic views of a dispensing assembly according to the invention.
Figure 3:
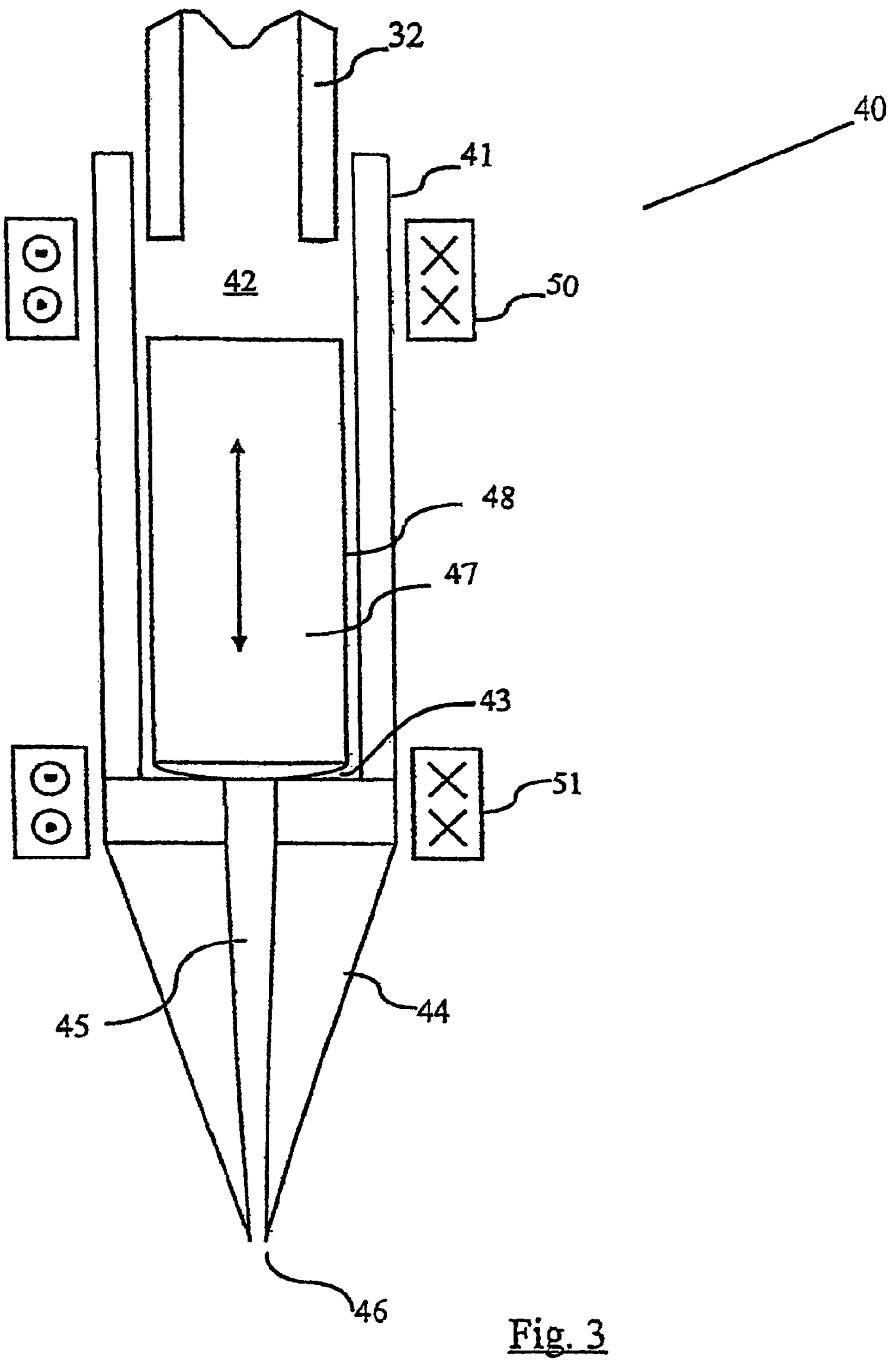

Referring now to FIGS. 2 and 3 there is illustrated a dispensing assembly for liquid droplets according to the invention, indicated generally by the reference numeral 20. The dispensing assembly 20 comprises a delivery means indicated generally by the reference numeral 21 which, in turn, comprises a pressure source 22 feeding a pressure regulator 23 and a pressure readout device 24 all connected to an electronic controller 25. The pressure readout device 24 in turn feeds through a high pressure airline 26, a switch 27 which is also fed by a vacuum pump 28 and vacuum line 29. The switch 27 is also connected to the electronic controller 25. The switch 27 connects by a further airline 30 to a reagent reservoir 31 which in turn feeds by a liquid carrying pipe 32, a dispenser, indicated generally by the reference numeral 40.

The dispenser 40 is illustrated in more detail in FIG. 3 and comprises of an elongated body member 41 having a main bore 42 connected at one end to the liquid carrying pipe 32. At the other end the main bore has a valve seat 43 connecting to a nozzle 44 having a nozzle bore 45 terminating in a dispensing tip 46. The valve boss 47 is an elongated plug-like valve boss for limited movement out of line with the main bore 42 of a ferromagnetic material covered with a soft polymer 48 is mounted in the main bore 42 and has a cross sectional area less than that of the main bore 42.

A separate valve boss actuating coil assembly comprising upper and lower coils 50 and 51 respectively are provided separate from the body member 41 and are also connected to the electronic controller 25. As can be seen in FIG. 2 the power source for the coils 50 and 51 is not illustrated.

Again referring to FIG. 2 a droplet receiving substrate 55 usually in the form of a series of wells is mounted below the dispensing tip 46 and above a conducting plate 56. The conducting plate 56 is connected to the electronic controller 25 through a high voltage source 57. Reagent when in the form of droplets is identified by the reference numeral 58 in FIG. 2.

It will be noted that the dispenser 40 is grounded to earth through a earthline 59, in effect making the dispensing tip 46 an electrode.

In operation the reagent is stored in the main bore 42 of the body member 41 and the controller 25 is operated to cause the coils 50 and 51 to be activated to raise the valve boss 47 off the valve seat 43 and to allow the reagent to pass between the valve boss 47 and the walls of the main bore 42 down into the nozzle bore 45 until the coils are activated again to shut off the valve by lowering the valve boss 47. As the valve opens the reagent is supplied to the dispensing tip 46 and the droplet 58 grows. The volume of the droplet 58 is obviously determined by the length of time the valve is open and, the viscosity of the liquid, the cross-sectional area of the nozzle bore, its length and also the pressure exerted on the liquid through the valve from the switch 27. It will be appreciated that if the pressure exerted on the liquid is sufficiently above ambient which is normally atmospheric (1 bar) the droplet will be ejected from the tip 46. However, in many instances, when the pressure is too low or in any case for accuracy, applying a relatively high voltage to the conducting plate 56 will cause an electrostatic field to be exerted between the dispensing tip 46 and the substrate 55 thus causing the droplet 58 to be pulled downwards onto the substrate 55 by a force considerably in excess of gravity.

To aspire reagent from a substrate or indeed from any reagent reservoir or container the vacuum pump 28 is operated and the switch 27 suitably arranged to ensure that the vacuum pump 28 and vacuum line 29 is connected to the dispensing assembly 20. The valve is opened and the liquid sucked up into the dispenser 40

Figure 4:
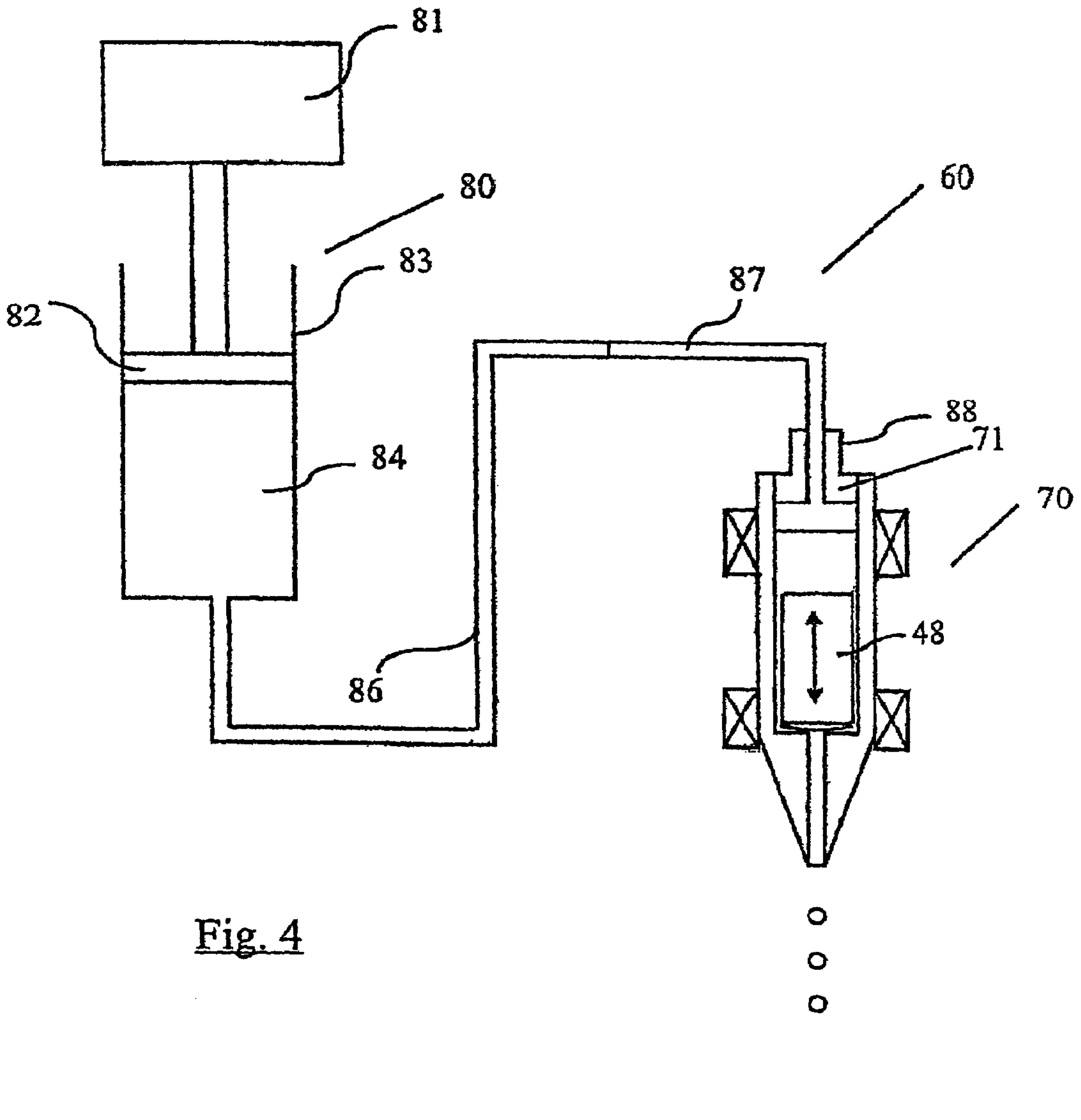
FIGS. 4 and 5 illustrate diagrammatically another alternative construction of dispensing assembly, FIG. 6 illustrate an alternative construction of dispenser.
Figure 5:
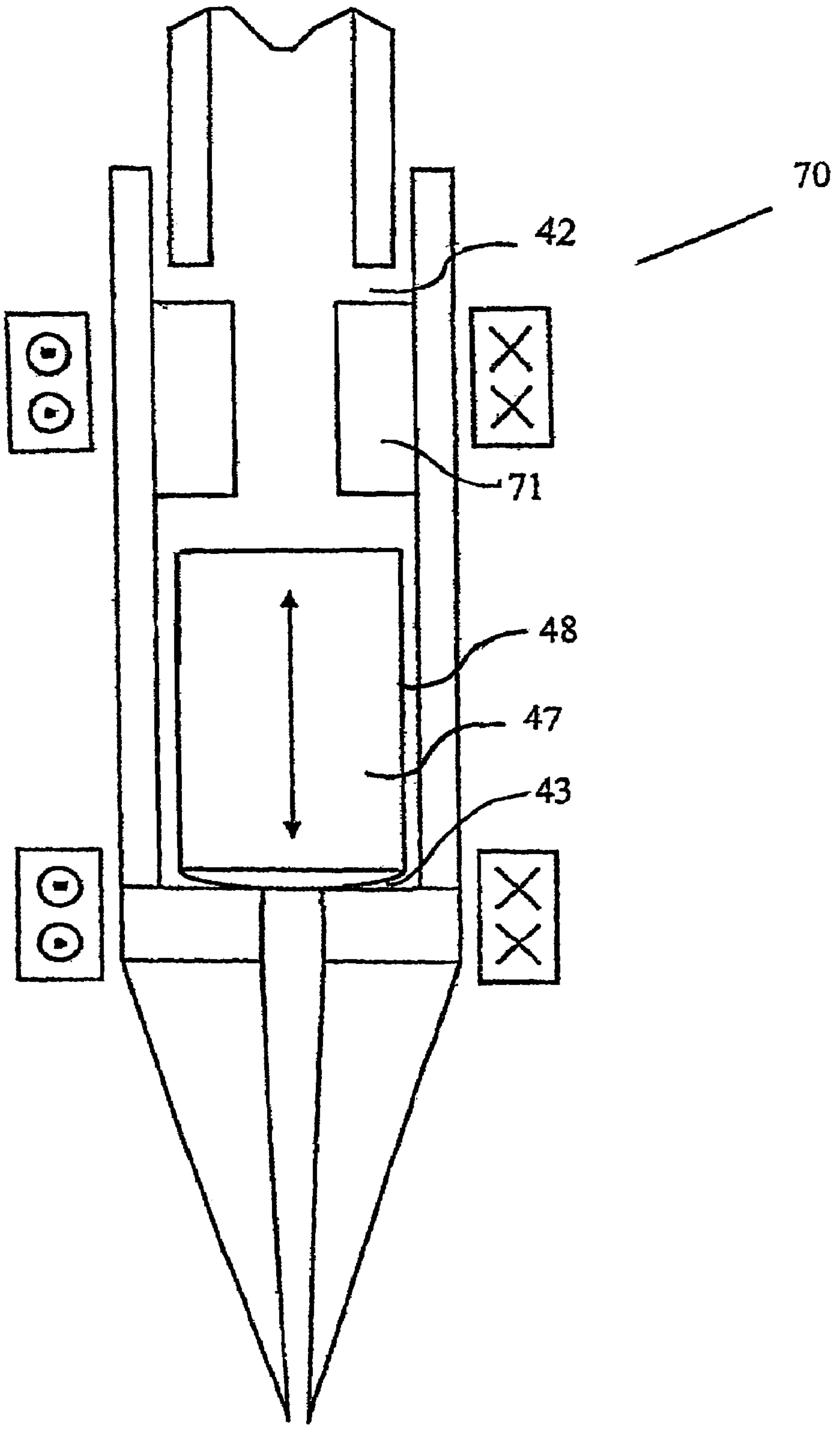

Referring now to FIGS. 4 and 5 there is illustrated an alternative construction of dispensing assembly indicated generally by the reference numeral 60. In this embodiment the dispenser is indicated generally by the reference numeral 70 and parts similar to those described in the previous FIG. 3 are identified by the same reference numerals. The only difference between the dispenser 70 and the dispenser 40 is that there is a boss stopper 71 provided in the main bore 42. In this embodiment referring specifically to FIG. 4 the delivery means indicated generally by the reference numeral 80 comprises a positive displacement liquid handling system. There is provided a stepper motor 81 incorporating suitable controls operating a piston 82 of a pump 83 containing water 84 delivered by flexible tubing 86 to the dispenser, air 87 separates the water 4 from the reagent. The tubing 86 is connected by a suitable seal 88 to the dispenser 70.

Figure 6:
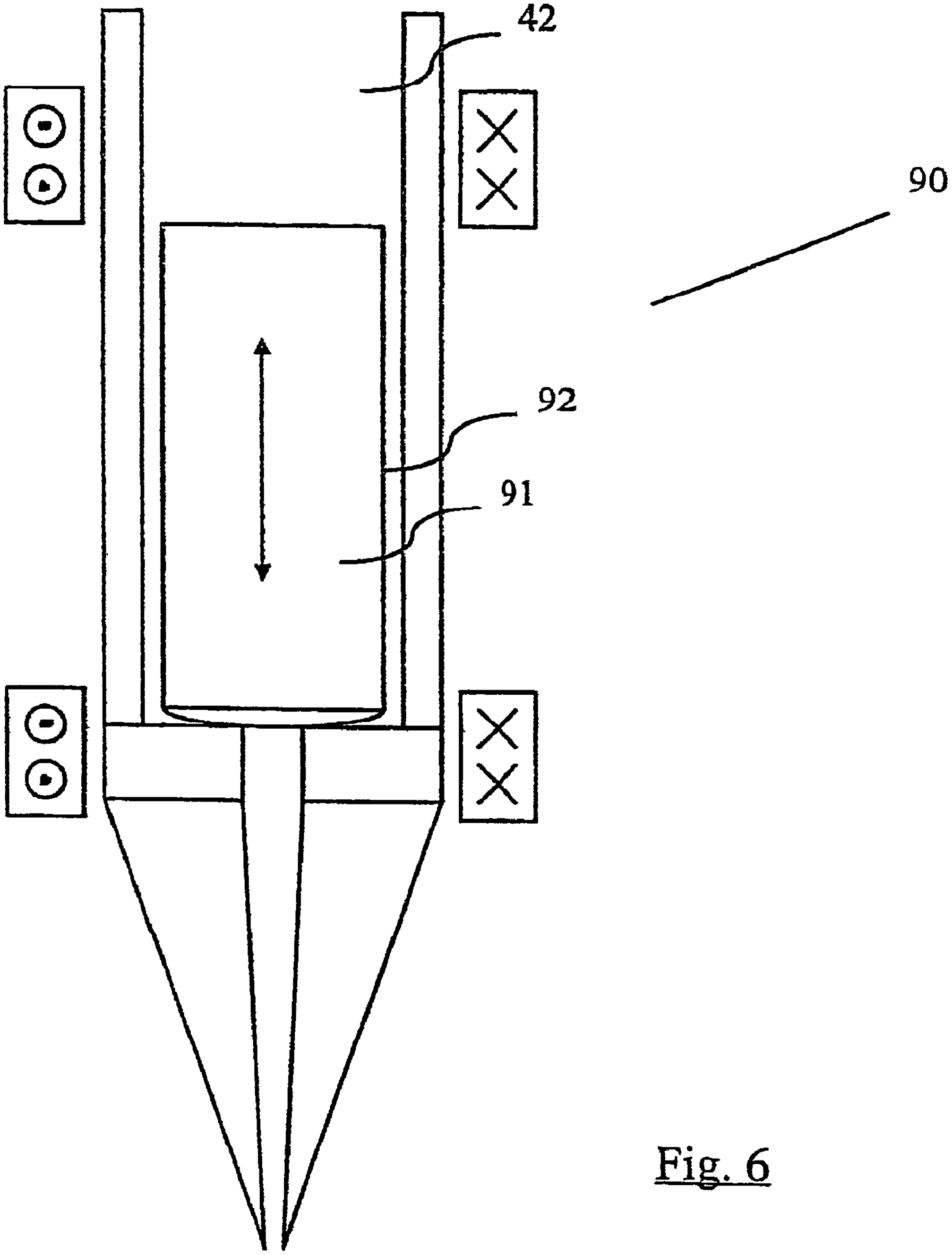

Referring to FIG. 6 there is illustrated in alternative construction of a dispenser, indicated generally by the reference numeral 90 in which parts similar to those described in the previous drawings are identified by the same reference numerals. In this embodiment the dispenser 90 includes a more elongated valve boss 91 of permanent magnetic material surrounded by a polymer coating 92. Again, it will be noted that the cross sectional area of the valve boss 91 with the coating is less than that of the main bore 42. It is advantageous to have the cylinder 91 magnetised along its axis as indicated by the arrow.

Figure 7:
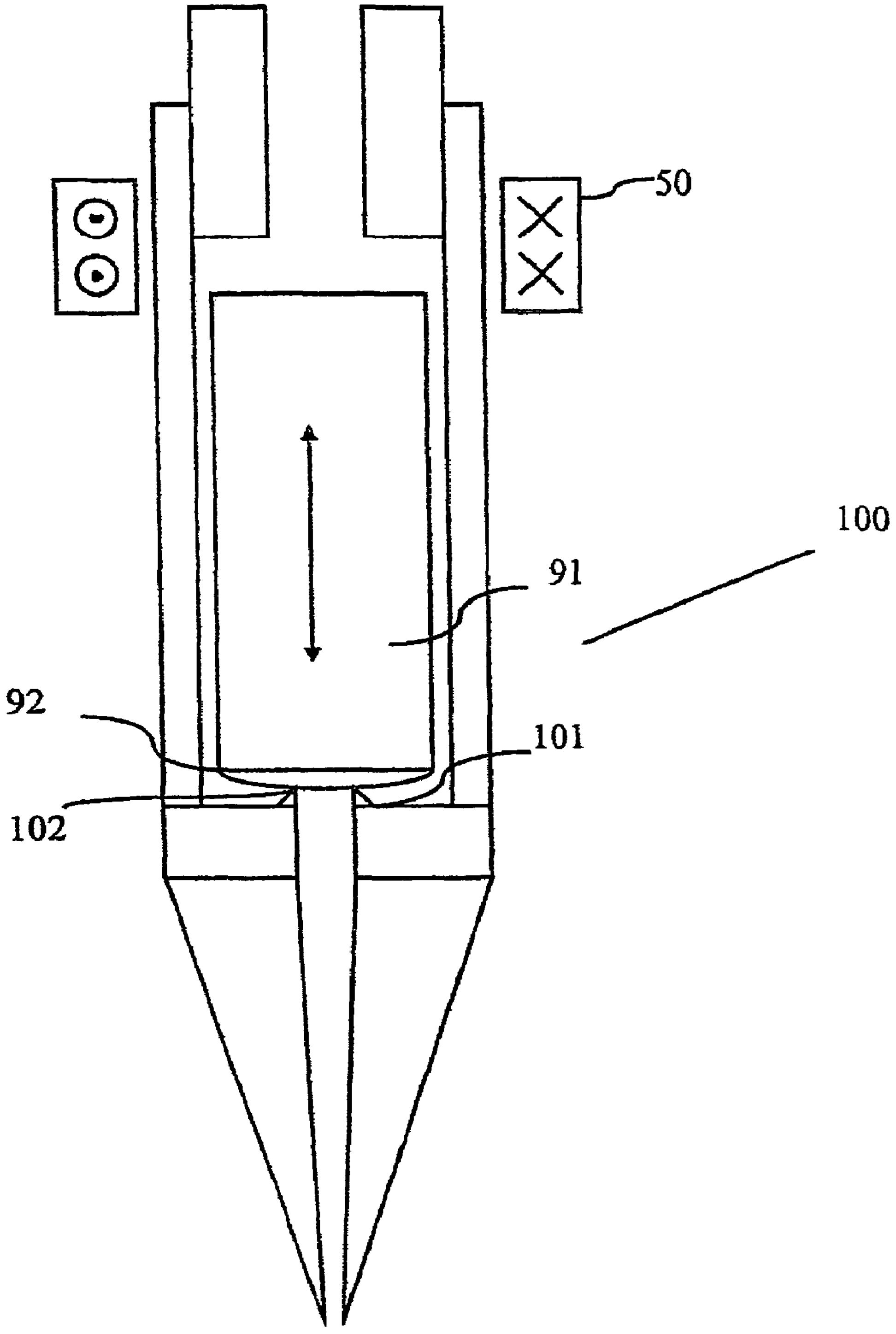
FIG. 7 illustrates another construction of dispenser.

FIG. 7 shows another construction of dispenser, identified generally by reference numeral 100, again parts similar to those described in the previous drawings are identified by the same reference numerals. In this embodiment there is provided a value seat 101 with a sharpened peripherial tip 102 which will engage the polymer coating of 92 of the cylindrical valve boss 91. In this embodiment there is only one coil 50 as the cylindrical valve boss 91 is of a permanent magnetic material. It is advantageous to have the cylinder 91 magnetised along its axis as indicated by the arrow.

Figure 8:
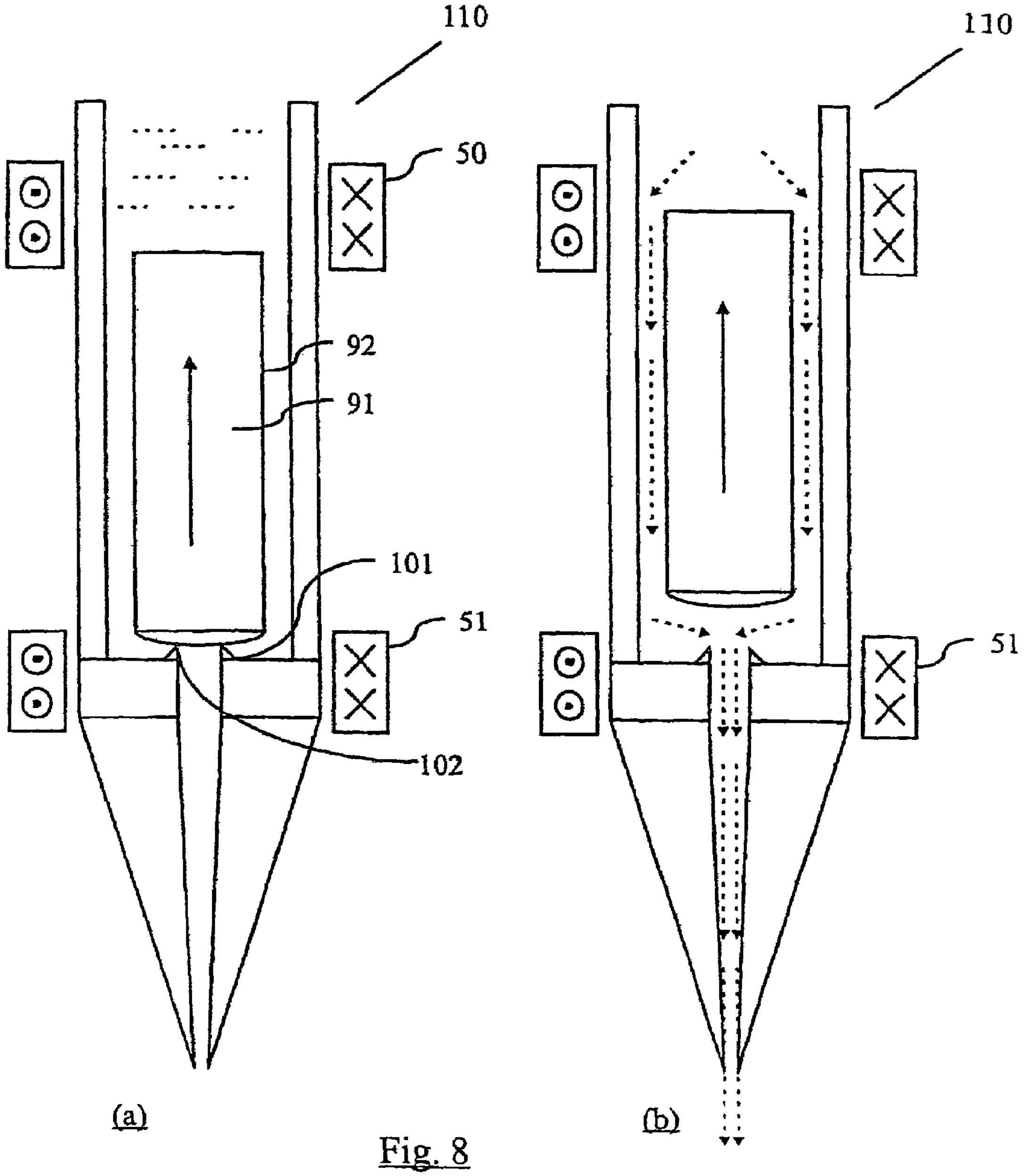
FIGS. 8(*a*) and (*b*) illustrates a further construction of dispenser in closed and open modes.

Referring now to FIGS. 8(*a*) and 8(*b*) there is illustrated another dispenser indicated generally by the reference numeral 110 in which parts similar to those described with reference to FIG. 7 are identified by the same reference numerals. This shows clearly the opening and closing of the dispenser 110 together with the direction of the liquid flow around the cylindrical valve boss 91. Two sets of coils 50 and 51 are used though the valve boss 91 is of a permanent magnetic material.

Figure 9:
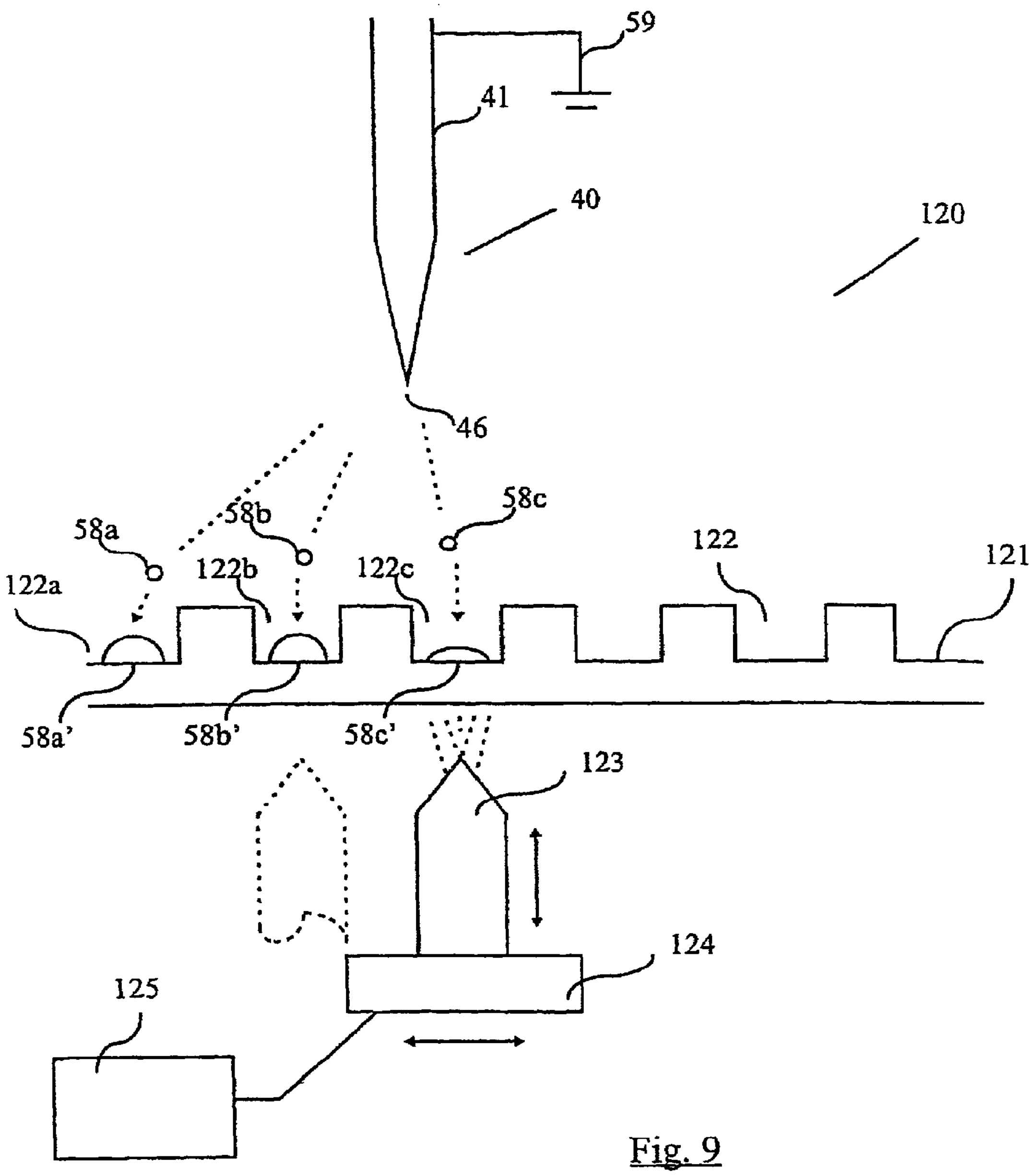
FIG. 9 illustrates another dispensing assembly according to the invention.

Referring now to FIG. 9 there is illustrated a dispensing assembly indicated generally by the reference numeral 120 incorporating a dispenser 40 as described above with reference to FIGS. 2 and 3. In this embodiment the droplets are identified by the numeral 58 and successive subscripts thus 58(*a*) to 58(*c*). The dispensing tip 46 effectively forms or incorporates an electrode by virtue of being grounded by the earth line 59. There is mounted below the dispenser 40 a receiving substrate 121 incorporating reagent wells 122. For three of the wells 122*a, b* and *c* there are, for simplicity identified by the same subscript letters, droplets 58*a, b* and *c* both approaching the wells 122 and in them. Positioned below the receiving substrate 121 is a receiving electrode 123 in turn mounted on an indexing table 124. The receiving electrode 123 is connected to a high voltage source 125.

The indexing table 124 is used to position the receiving electrode 123 below the appropriate reagent well 122 as shown by the interrupted lines in the drawing.

Figure 10:
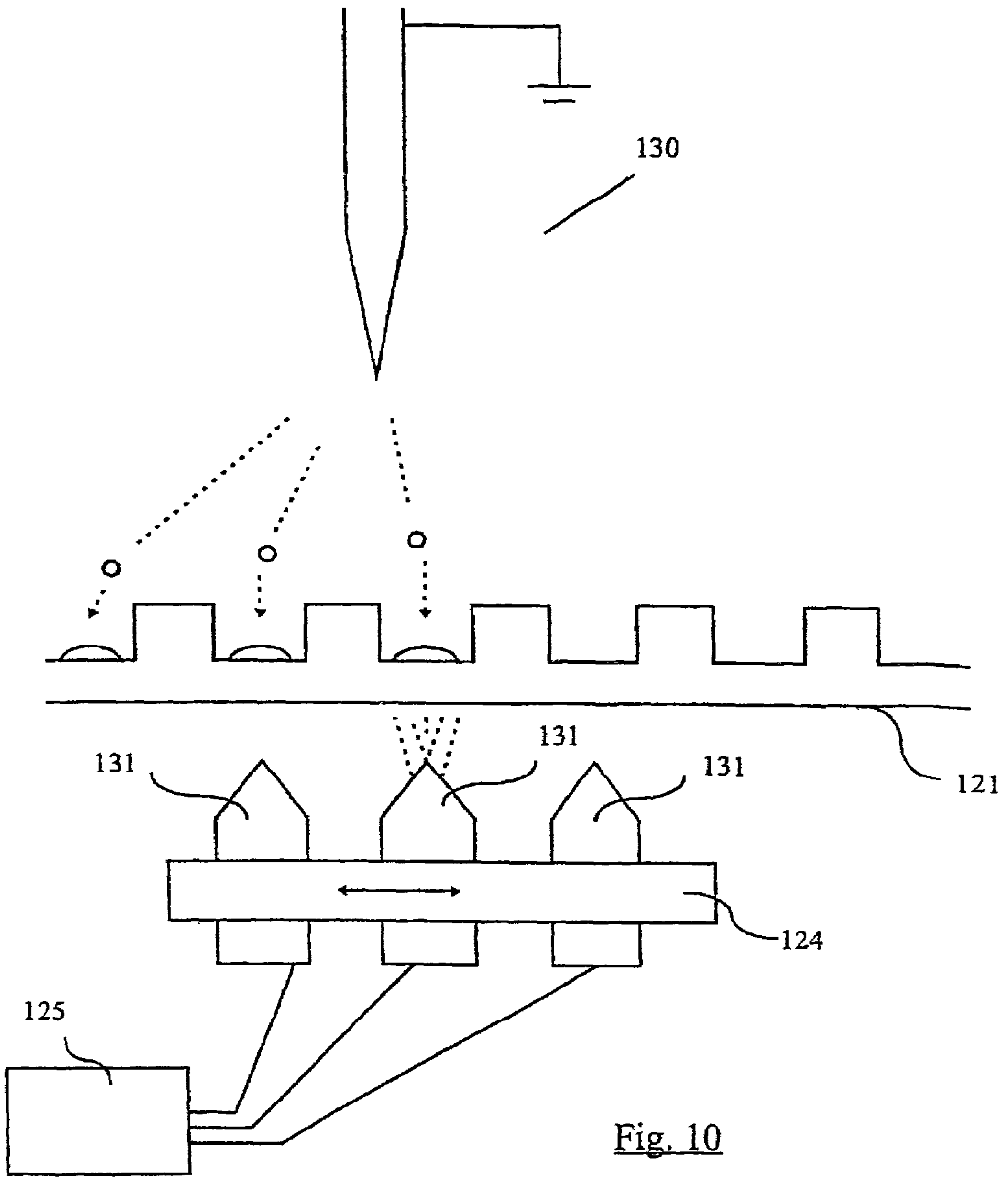
FIG. 10 illustrates a still further dispensing assembly.

Referring now to FIG. 10 there is illustrated an alternative construction of dispensing assembly, indicated generally by the reference numeral 130 in which parts similar to those described in FIG. 9 are identified by the same reference numerals. In this embodiment there is provided a plurality of receiving electrodes 131 on the indexing table 124, which are individually connected to the high voltage source 125.

Figure 11:
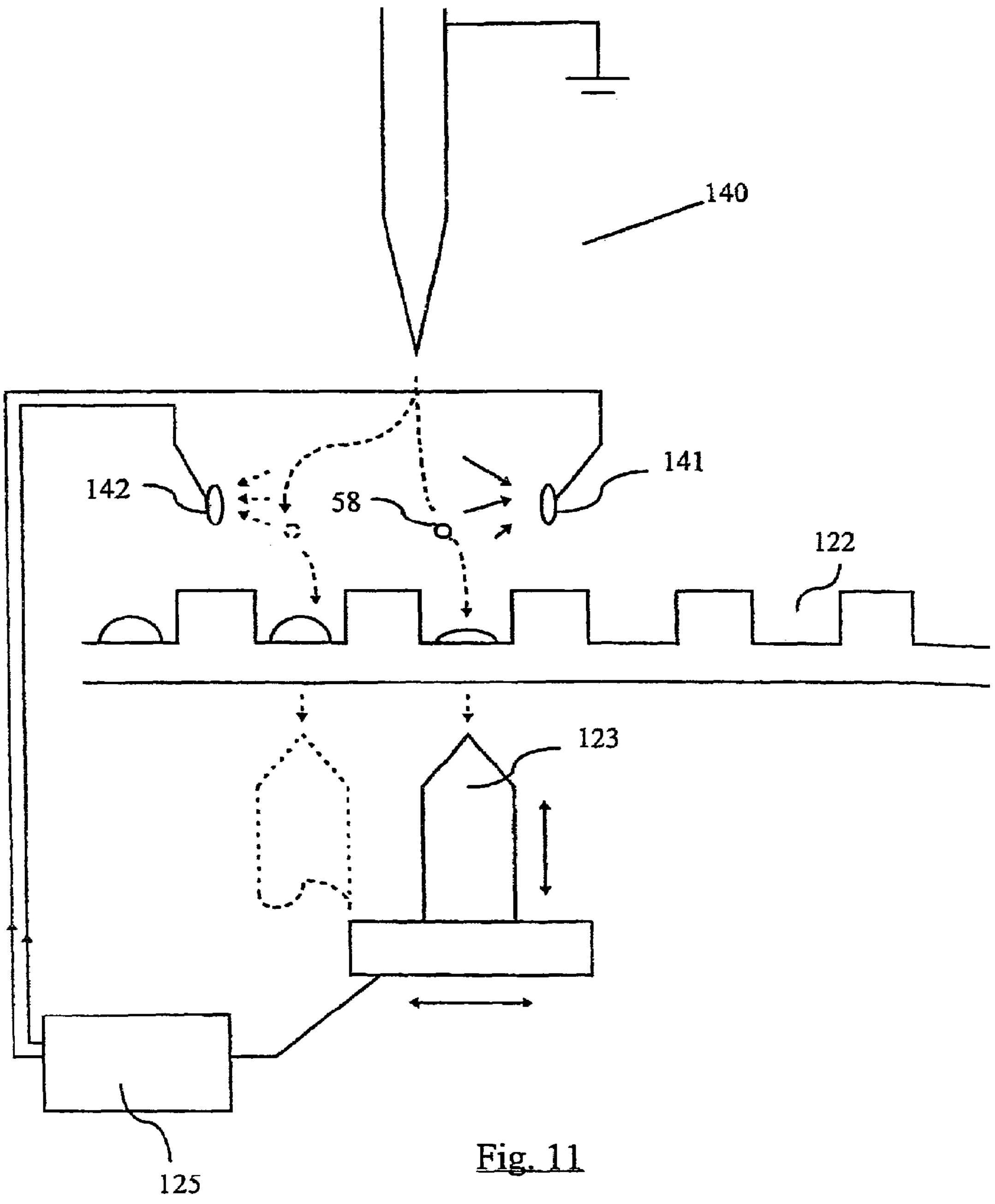
FIG. 11 illustrates another dispensing assembly.

Referring now to FIG. 11 there is illustrated still further construction of dispensing assembly indicated generally by the reference numeral 140 in which parts similar to those described with reference to FIG. 9 are identified by the same reference numerals. In this embodiment there are provided additional deflecting electrodes 141 and 142. It will be appreciated that depending on the voltage on the deflecting electrodes 141 and 142, the droplets 58 will in conjunction with the receiving electrodes 123 navigate into the appropriate reagent well 122. This is illustrated clearly in FIG. 11 by the interrupted lines.

In FIG. 11 there is also shown a receiving electrode 123 but it will be appreciated that such a receiving electrode 123 will not always be necessary. It is also possible to use a conducting plate such as illustrated in FIG. 2 or it is possible to use only deflecting electrodes. However, what will be appreciated by consideration of the dispensing assemblies as illustrated in FIGS. 9 to 11 inclusive is that electrostatic navigation of the drops by means of both the receiving electrodes and the deflecting electrodes can be relatively easily achieved.

Before discussing in any more detail certain other aspects of the present invention it is necessary to discuss in some detail the nature of droplet formation, the effect of the electrostatic field on its drop-off from a dispensing tip and the various other factors that govern the volume of the droplet and its formation.

Test No. 1.

| | | | |
|---|---|---|---|
| Liquid | | | Water |
| Temperature | | | 20° C. |
| Delivery pressure | | | 1 Bar (15 psi) |
| Valve boss | | | Samarium Cobalt permanent magnet |
| | Length | 5.5 mm | |
| | Diameter | 1.8 mm | |
| | Lower valve seat contacting side -nitrile rubber 1 mm thick | | |
| Actuating coil resistance | | | 30 Ohm |
| Nozzle | Length | 35 mm | |
| | Internal diameter | 100 micron | |
| | Outside diameter | 170 micron | |

In this experiment the pressure was not sufficiently high to eject the droplet from the nozzle and a grown drop remained on the dispensing nozzle. Tolerance for the drop volume was ±1 nl. The drop volume was measured by transferring the drop grown to a calibrated capillary.

Activation phases:

Phase 1 (strong force to open the valve quickly)

Voltage 22V

Duration 0.2 to 0.5 ms

Phase 2 (no applied force).
Voltage 0V
Duration 0.1 to 1 ms
Phase 3 (strong force to close the valve quickly)
Voltage 22V
Duration 0.2 to 0.4 ms
Phase 4 (small force to keep the valve closed to prevent leakage and dump oscillations)
Voltage 4V
Phase 4 is the interval between cycles.

Figure 12:
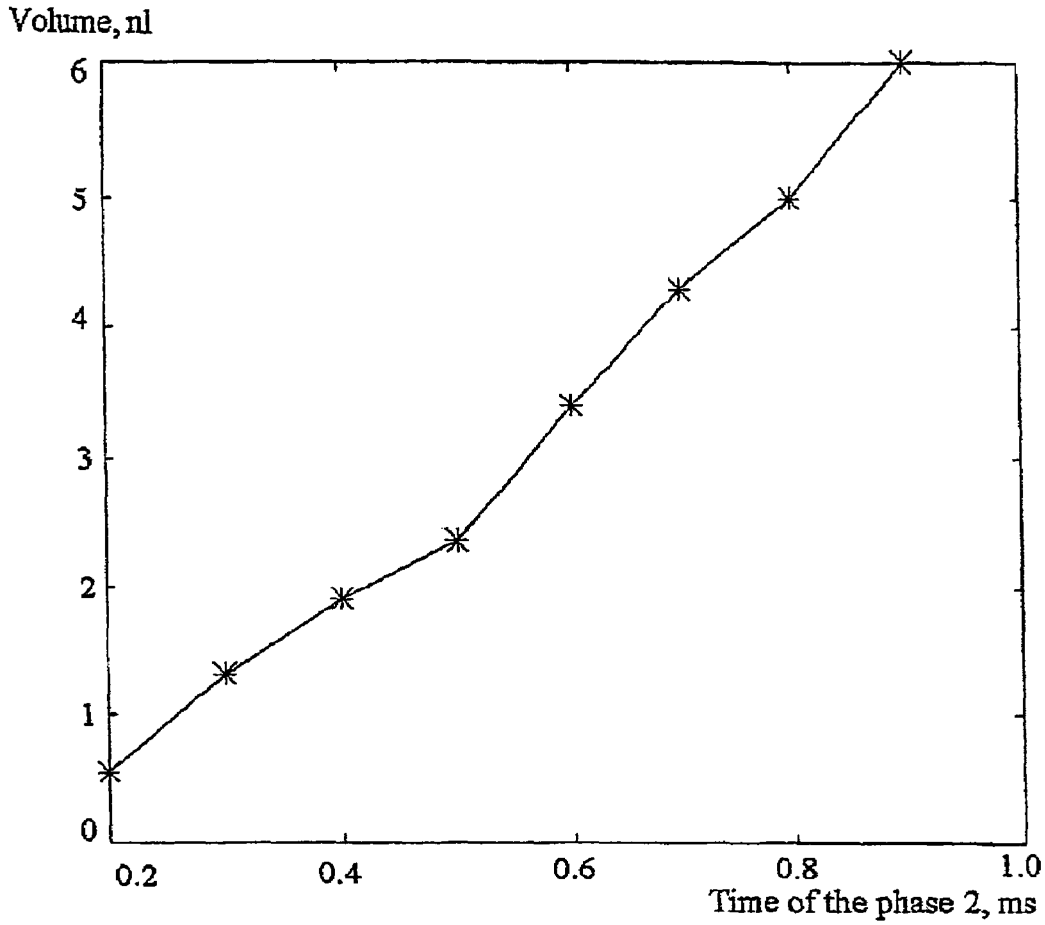
FIG. 12 is a graph of low pressure droplet formation.

FIG. 12 shows the dependence of the volume of the droplet grown at the dispensing tip as a function of the duration of phase 2.

Test No. 2.

Figure 13:
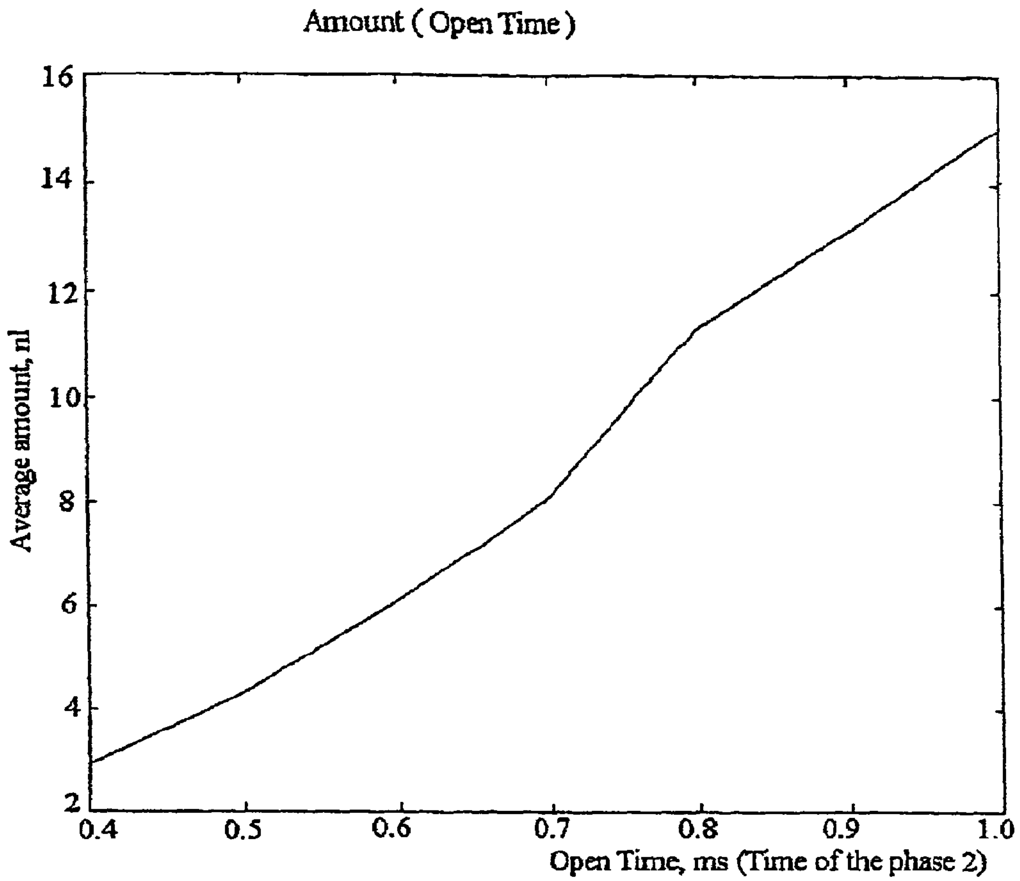
FIG. 13 is a graph of high pressure droplet formation.

All the conditions remained the same as in Test No. 1 except that the pressure in the line connected to the dispenser was increased to 10 bar (150 psi). In this experiment drops were ejected from the nozzle by the pressure gradient which was sufficient to eject the drops and the tolerance of the measuring volume of the drops was ±3 nl. FIG. 13 illustrates the results obtained.

In both of the above two tests it is important to appreciate that the shape and construction of the nozzle will vary the test results and thus different test results will be achieved for different constructions of nozzle.

Test No. 3

The conditions of the dispensing assembly were identical as for Tests No. 1 and No. 2 with the addition of a conducting plate. This was spaced from the dispensing tip by 10 mm and had dimensions 100 mm×100 mm.

A high voltage was applied to the conducting plate which was arranged in substantially the same manner as the dispensing assembly of FIG. 2.

The test was carried out by growing a droplet on the dispensing tip of the nozzle by opening the valve. Then the voltage was gradually increased until drop off occurred, when it was recorded. The volume of the droplet measured by repeating this with the electromagnetic balance, details of which are described later.

Figure 14:
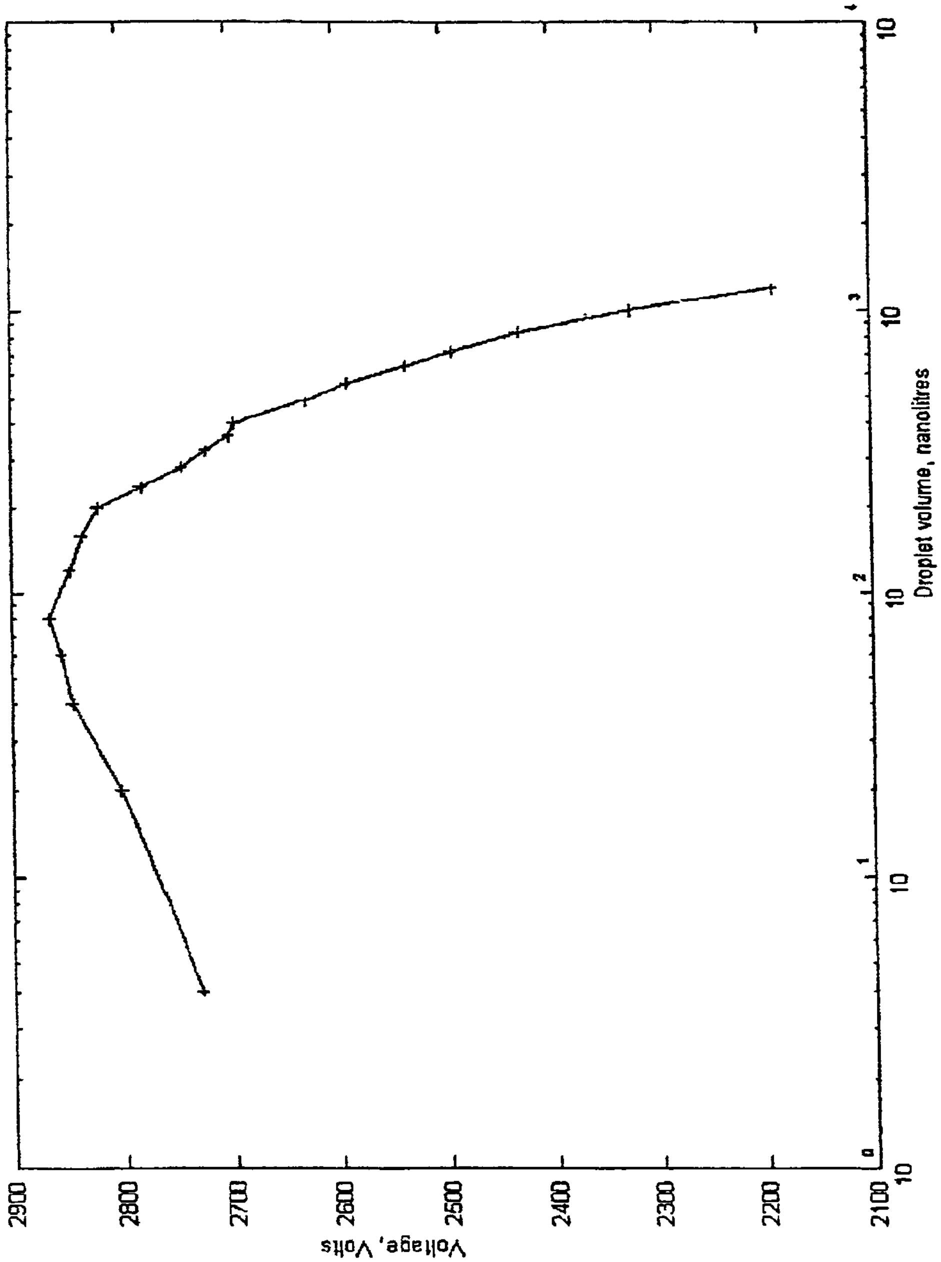
FIG. 14 is a graph showing the effect of a droplet volume on the drop-off voltage.

FIG. 14 shows clearly the dependence of the drop off voltage as a function of the volume of the drop grown at the end of the dispensing tip.

Test No. 4

Figure 15:
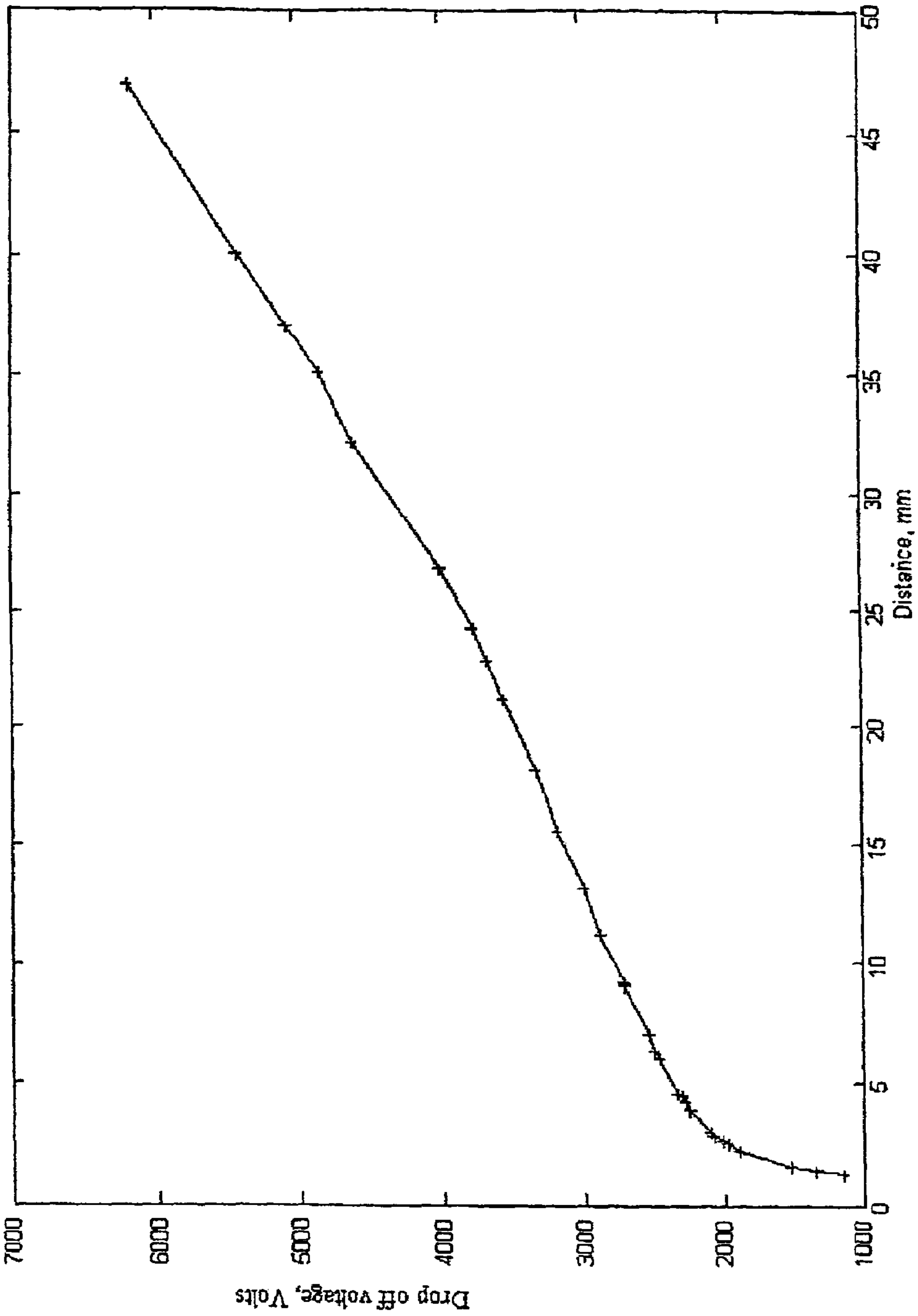
FIG. 15 is a graph of drop-off voltage against distances from tip to an electrode.

A volume of droplet 40 nanoliter was chosen with the remainder of the conditions the same as Test No. 3. In this test the dependence of the drop off voltage as a function of the distance between the end of the nozzle and a conducting plate was tested and the results are given in FIG. 15.

Test No. 5

Figure 16:
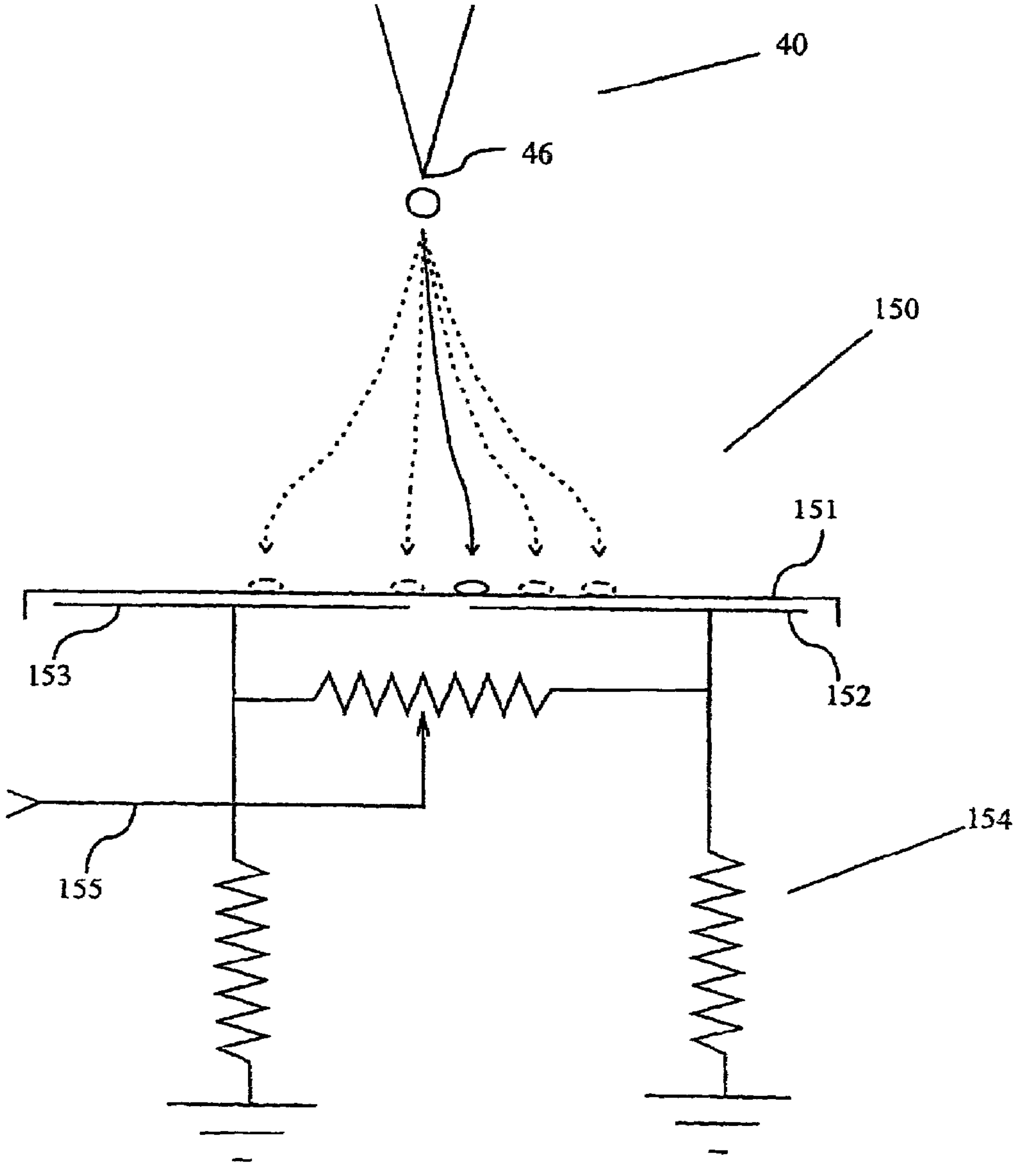
FIG. 16 illustrates diagrammatically a test assembly.

With the same construction of dispensing assembly as for Test No. 4 and with referring specifically to FIG. 16 there is illustrated a test assembly indicated generally by the reference numeral 150 incorporating a dispensing assembly as illustrated in FIGS. 4 and 8. There is provided a substrate 151 below which is mounted a pair of receiving electrodes in the form of plates 152 and 153 which in turn are connected to an electrical circuit indicated generally by the reference numeral 154 incorporating a high voltage supply 155 of approximately 5 KV. The separation between the dispensing tip and the substrate 151 was 15 mm. Tests were carried out.

Figure 17:
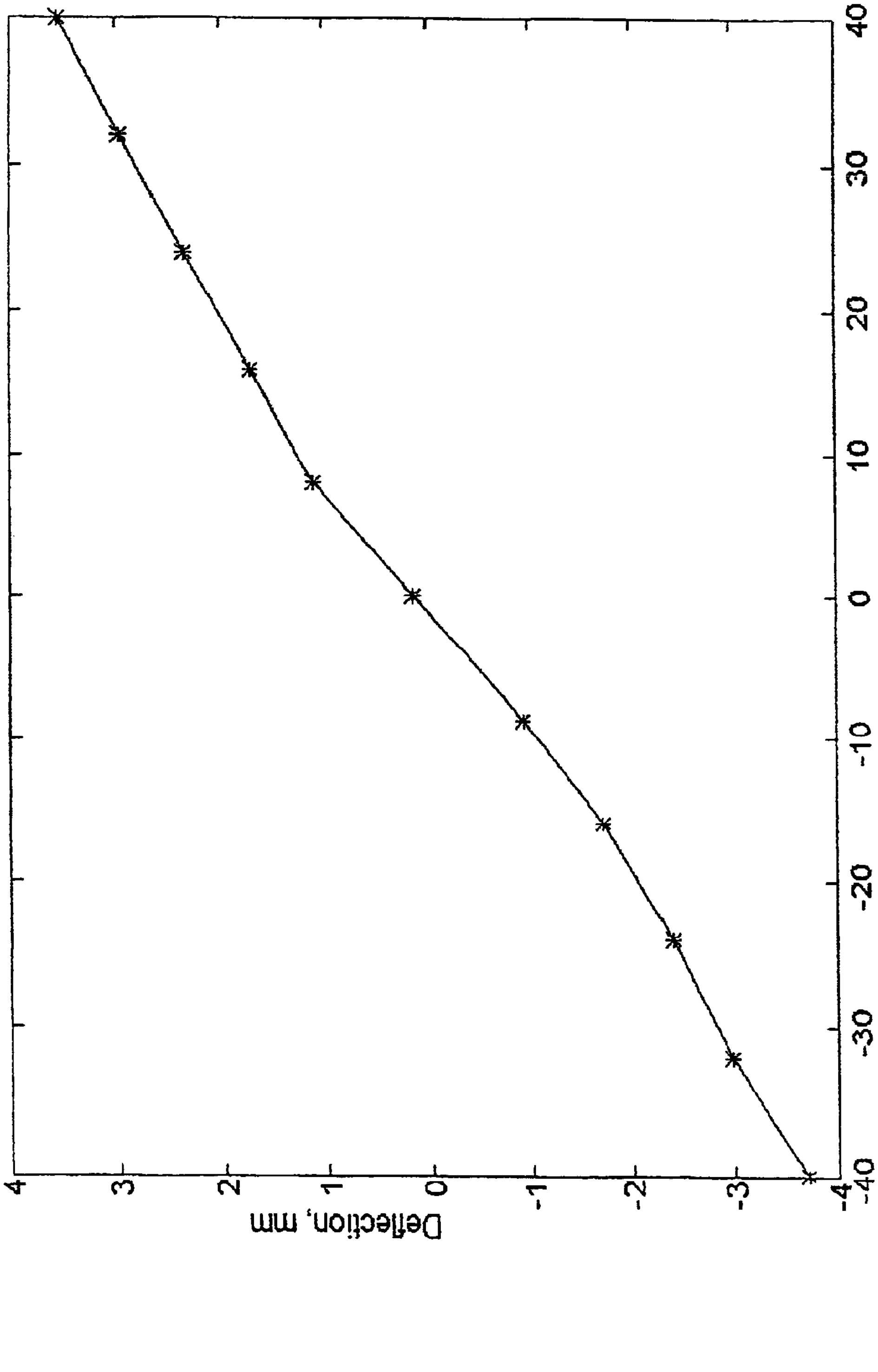
FIG. 17 is a graph of the effect of deflection electrode voltage on a droplet deflection.

FIG. 17 shows the deviation of a droplet as a function of the potential difference applied to the plates 152 and 153. The potential difference between the plates 153 and 152 is measured in percentage of the potential difference between the average of the potentials of 152 and 153 and the nozzle 46.

Figure 18:
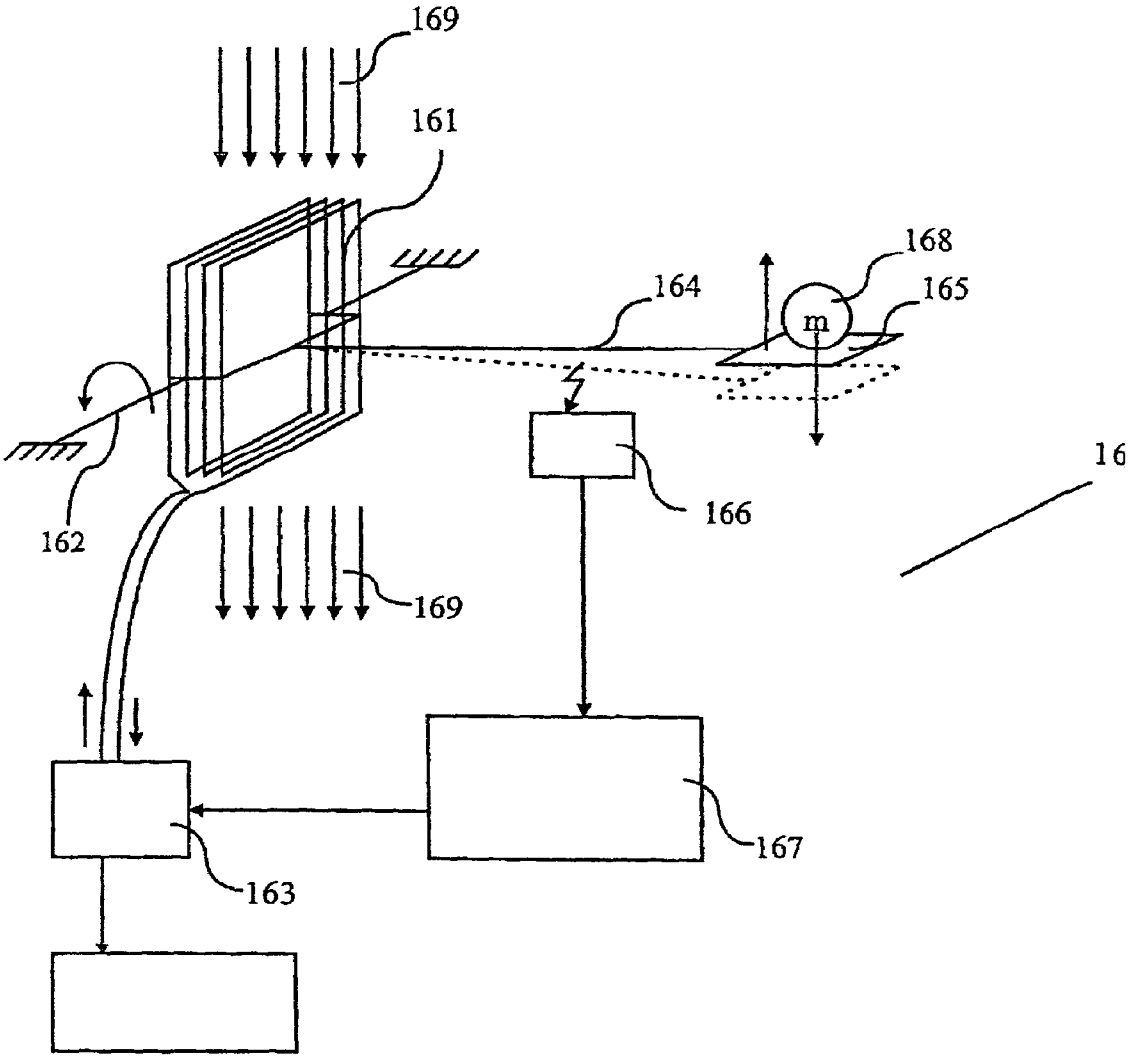
FIG. 18 illustrates diagrammatically an electromagnetic balance.
Figure 19:
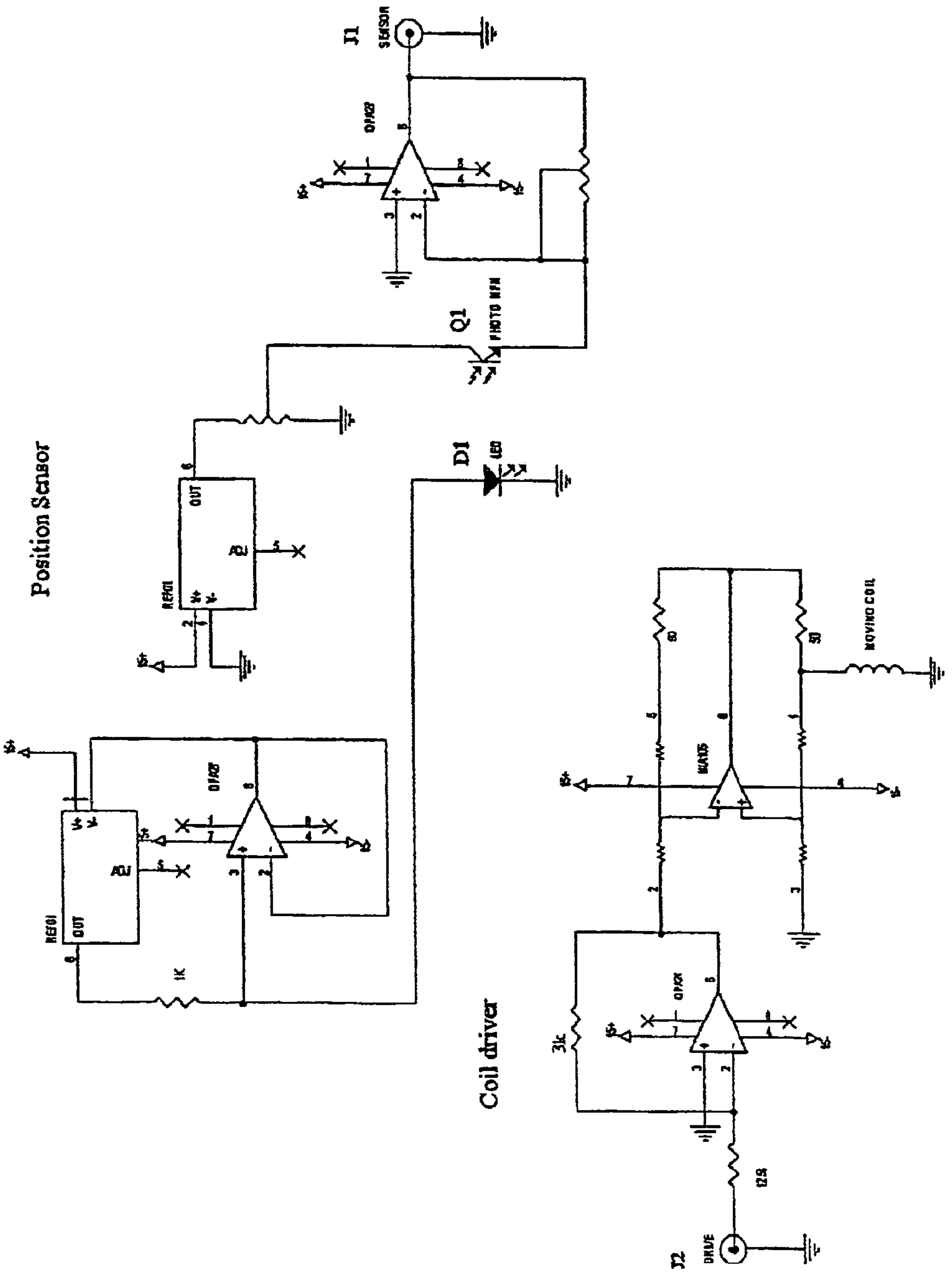
FIG. 19 gives the circuit diagram of the electromagnetic balance of FIG. 18.

Referring now specifically to FIGS. 18 and 19 there is illustrated an electromagnetic balance for the measurement of the mass of droplets dispensed in accordance with the invention.

The electromagnetic balance 160 comprises a receiving coil 161 across which a magnetic field may be applied suspended on a fine spring provided by a twisted spring coil 162 and powered by a controlled current source 163. Lines of the magnetic field are schematically indicated with the numeral 169. The receiving coil 161 supports by a balance arm 164 carrying a droplet receiving plate 165. A position sensor 166 is provided adjacent the balance arm 164 and is connected to a feed back controller 167 which in turn is connected to the controlled current source 163. The position sensor 166 in one embodiment is a light emitting diode and a photo diode coupled optically. It will be appreciated that the torque acting on the receiving coil 161 is proportional to the current carried by the receiving coil 161.

To measure the gravity force of a droplet identified by the reference numeral 168 on the receiving plate 165 when the position sensor 166 senses a deviation of the balance arm 164, the feedback controller 167 signals the controlled current source 163 to change the current into the receiving coil 161 until the previous unloaded position is attained. Thus the gravity force exerted by the droplet 168 is proportional to the change in current in the coil 161, then using simple calibration the mass of droplets can be measured directly and accurately.

FIG. 19 shows in some more detail the electronic circuit of the electromagnetic balance 160. D1 is the light-emitting diode, Q1 is the photodiode. Output J1 supplies the voltage which is dependent on the position of the arm. This output is connected to the analogue-to-digital converter and processor controlled feedback circuit for continuous comparison of the actual position of the arm with the preset value. The feedback circuit produces signal proportional to the current needed to be supplied to the coil to control the position of the arm. This signal in the form of a voltage is applied to the input J2 and the current is taken from the output as marked "Moving Coil" normally the coil 161.

As has been shown already the dependence of the breaking voltage is a function of the volume of the droplet on the dispensing tip. It becomes important to ascertain exactly when the droplet is released from the dispensing tip. Accordingly the invention provides various methods of detection of the separation of a droplet from the dispensing tip. Once the electrostatic force causing the drop off to be achieved is known, then the volume of the droplet can be calculated within relatively fine limits.

Figure 20:
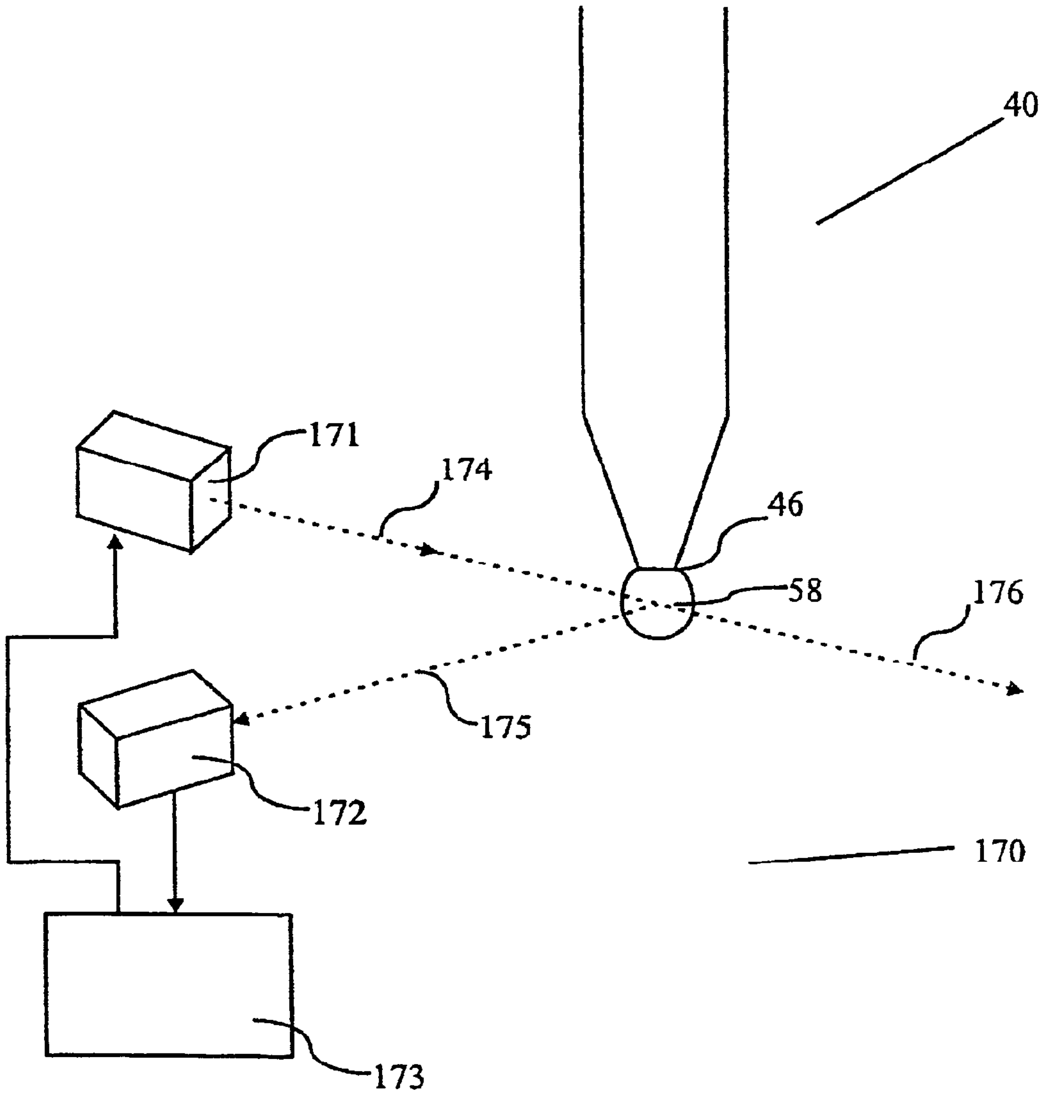
FIGS. 20 to 24 show various droplet drop-off detectors according to the invention, FIG. 25 records a test to ascertain that the volume of a droplet is related to the electrostatic charge it holds.

Referring to FIG. 20. there is illustrated a detector indicated generally by the reference numeral 170, for sensing the separation of a droplet from the dispensing tip. Again for illustrative purposes the dispenser 40 of FIG. 2 is illustrated. The detector 170 comprises source 171 of electromagnetic radiation, an electromagnetic collector 172 and a controller 173 connected to the electromagnetic radiation source 171 and collector 172.

In this embodiment the electromagnetic radiation source 171 is a laser. There is illustrated a laser beam 174 emanating from the electromagnetic radiation source 171 and then either being reflected as a further laser beam 175 to the electromagnetic collector 172 or as a beam 176 passing straight beyond the dispensing tip 46 when a droplet 58 is not in position.

The term "radiation transmitted" when used in this specification in respect of a droplet covers both reflection and refraction.

It will be appreciated that only a fraction of the laser beam 174 returns as the beam 175 to the electromagnetic radiation collector 172.

Figure 21:
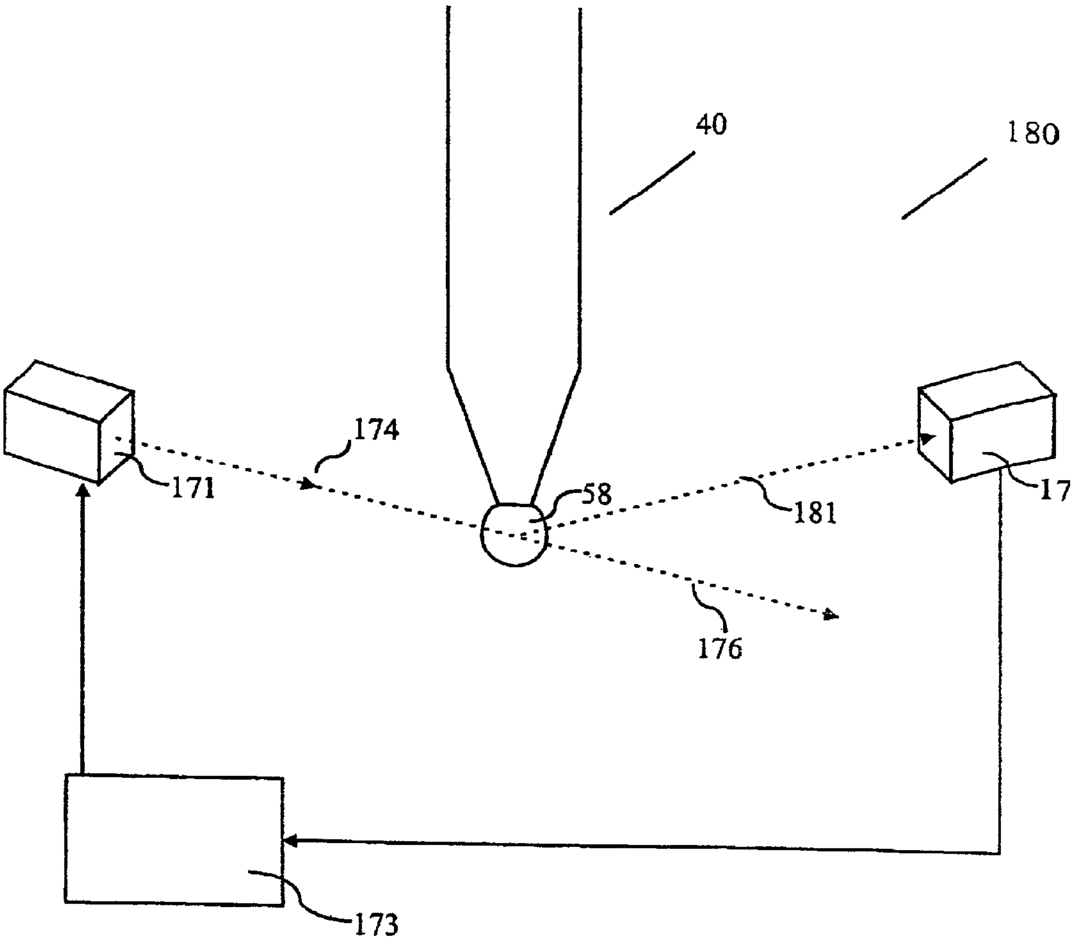

Referring to FIG. 21. there is illustrated another construction of detector arrangement indicated generally by the reference numeral 180 in which parts similar to those described with reference to FIG. 20 are identified by the same reference numerals. In this embodiment 174 is either a retracted beam 181 if the droplet 58 is in position or is simply as before the bypassing beam 176.

Figure 22:
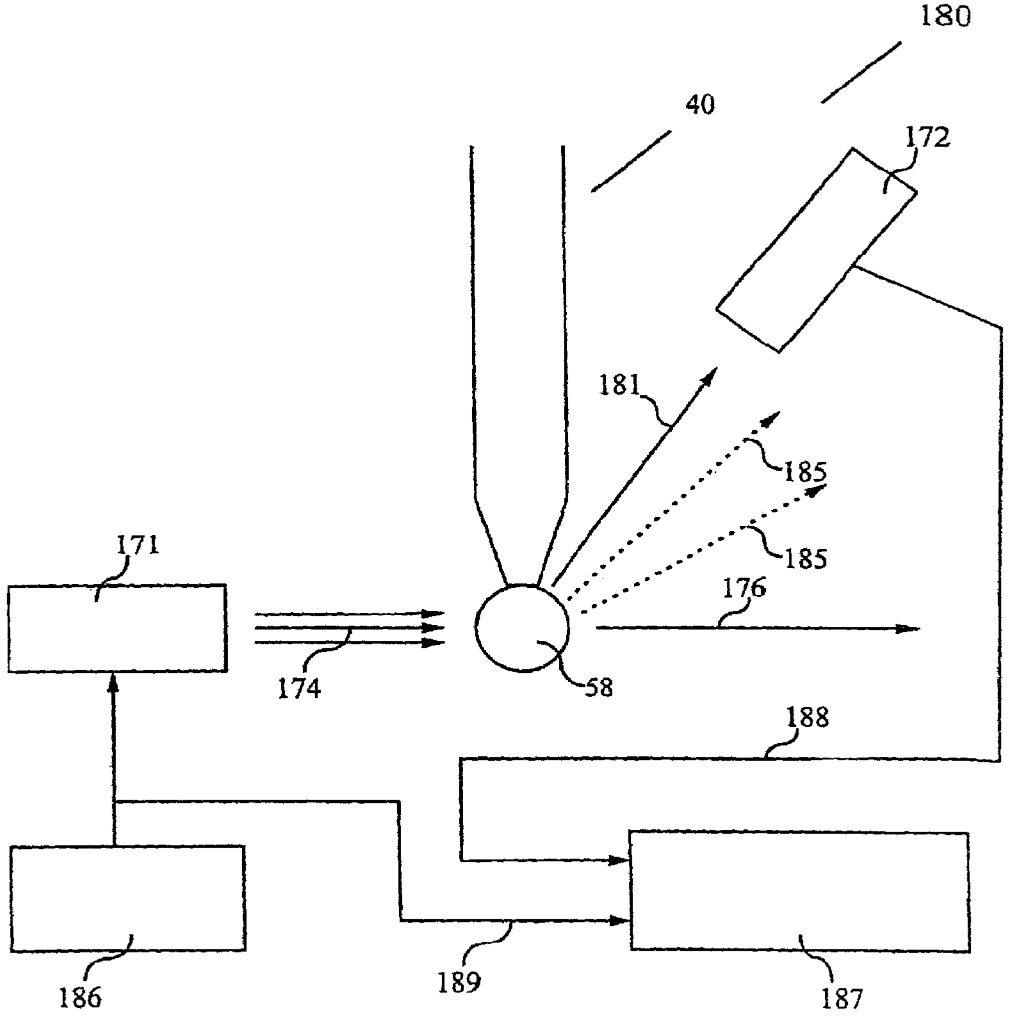

Referring now to FIG. 22 there is illustrated a slightly different arrangement of the detector illustrated in FIG. 21 and thus parts similar to those described with reference to the previous drawings are identified by the same reference numerals. In this embodiment additional scattered light beams 185 are illustrated as is a modulator 186 and a lock-in amplifier 187. A signal input to the lock-in amplifier 187 is identified by the reference numeral 188 and a reference input signal is identified by the reference numeral 189.

Figure 23:
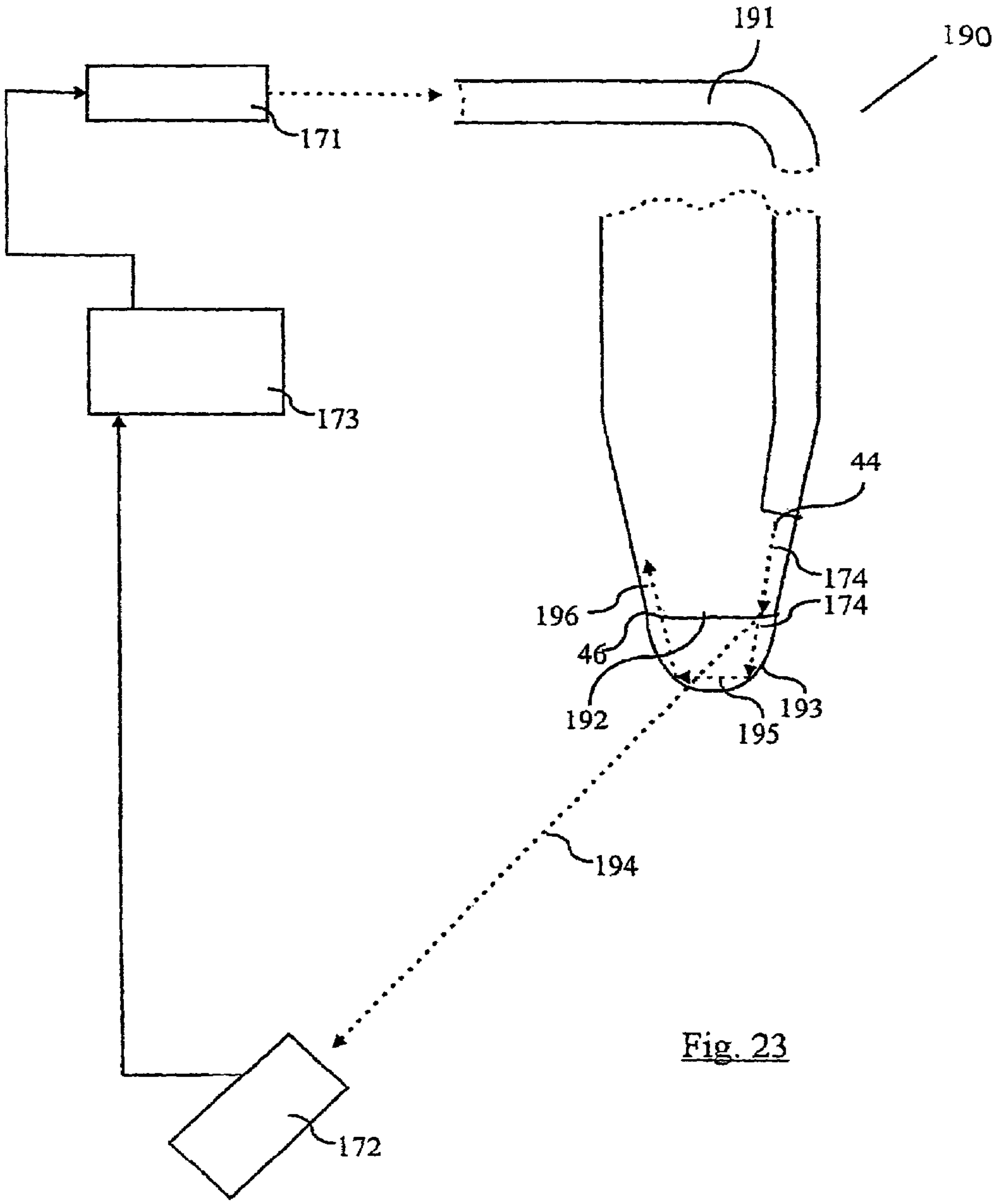

Referring now to FIG. 23 there is illustrated a further construction of detector indicated generally by the reference numeral 190 again used with the dispenser of FIG. 2 and in which parts similar to those described with reference to FIGS. 20 and 21 are identified by the same reference numerals.

In this embodiment the electromagnetic radiation source 171 delivers radiation through a fibre-optic cable 191 down the nozzle 44. Reference numerals 192 and 193 show the meniscus of a droplet being formed on the dispensing tip 46, namely one forming a flat meniscus 192 and the other a curved meniscus 193. The beam 174 when there is flat meniscus 192 on the dispensing tip 46 will be delivered through it as the beam 194 to the detector 172. However when the meniscus is a curved meniscus 193, the beam 174 will be delivered as a beam 195 and a further beam 196 away from the detector 172.

Figure 24:
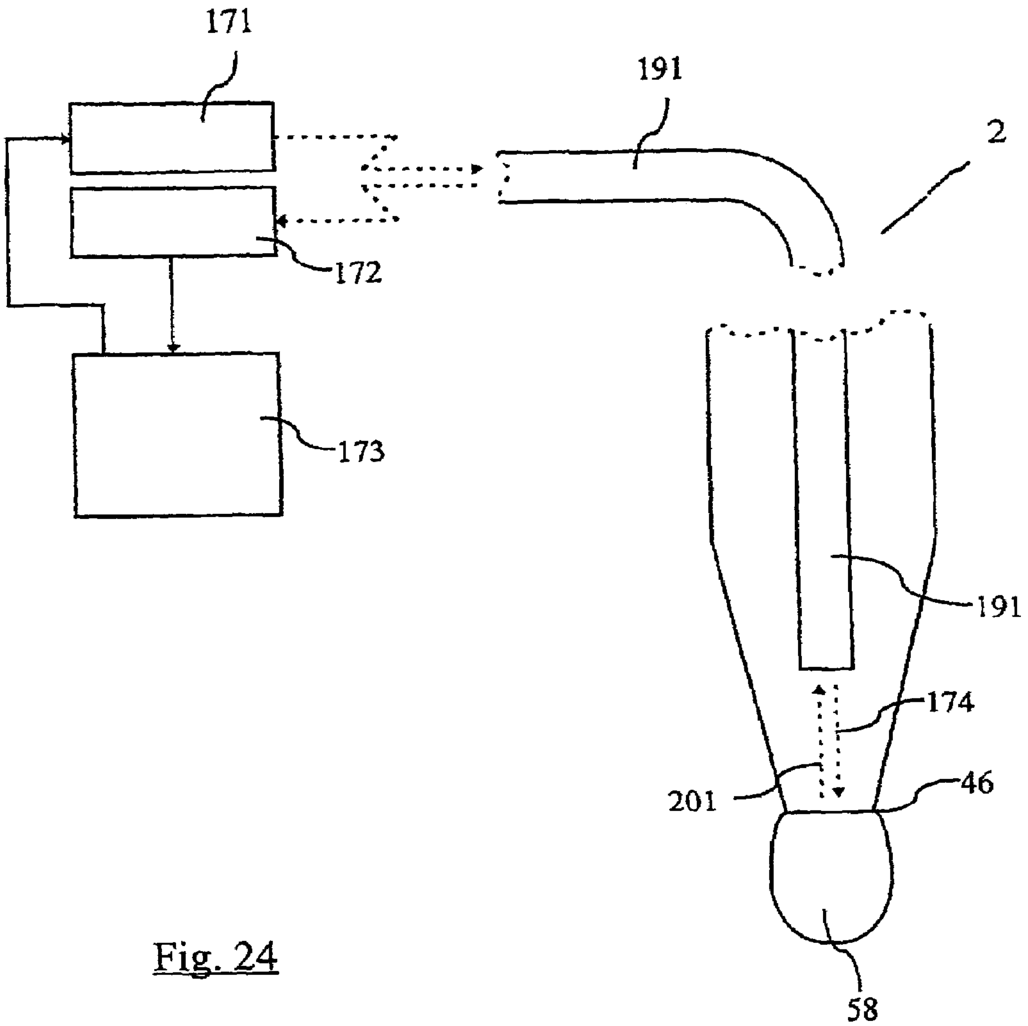

Referring now to FIG. 24 there is illustrated a further construction of detector indicated generally by the reference numeral 200 in which the parts similar to those described with reference to the previous drawings are identified by the same reference numerals. It will be appreciated that in this embodiment the beam 174 will always form a reflected beam 201 once a droplet whether formed or not is present. The reflected beam will vary in intensity. Thus there will be a variation detected at the detector 172. It will be appreciated that an optical coupler will need to be installed between the electromagnetic radiation source 171 and the collector 172 on one side and also in the fibre-optic guide 191 on the other.

It will be appreciated that in certain embodiments of the invention it will be necessary to calibrate the dispensing assembly for each new liquid or reagent handled since as explained above the volume dispensed depends on the properties of the liquid and especially on the viscosity thereof. Therefore each time a new liquid of unknown properties is to be dispensed, the dispenser should be calibrated. As explained above the use of an electromagnetic balance as described herein would be particularly suitable. Further as has been explained already, the drop off voltage is a function of the volume of the droplet, and over a substantial range of volumes it is effectively a monotonous function. That is to say the smaller the volume of the drop, the greater it is the drop off voltage for a given diameter of the nozzle and a given fluid. As was shown already with reference to FIG. 14 this is monotonous for a range of some 40 nl to well over one microliter for water. Further, the range of volumes in which the function is monotonous can be adjusted by changing the bore of the nozzle. Therefore, by varying the voltage and monitoring the moment when the droplet is detached from the dispensing tip, one can ascertain clearly the volume of the droplet. Monitoring the moment of the drop off is a much simpler task than the one of complex measurement of the drop volume in flight. However, as will be explained later this can also be done.

As explained already one method for the direct measurement of the volume of the drop which is not based on the detection of the separation of the droplet from the dispensing tip would be to measure the charge of the droplet as will be described thereinafter. It is proposed in the present invention to use a Faraday Pail in conjunction with the present invention.

Faraday Pails are well known and are described in many published documents (see for example Industrial Electrostatics by D. M. Taylor and P. E. Secker, Research Studies Press, 1994 ISBN 0-471-0523333-8) and Electrostatics: Principles, Problems and Applications by J. Cross, Adam H Iger ISBN 0-85274-589-3). Essentially, the Faraday Pail consists of an outer shield and an inner conductive box or chamber. The shield and chamber are well insulated from each other and indeed it is advantageous to keep the outside shield and the chamber at the same potential. In this situation, a charged droplet arriving at the chamber induces the same charge with opposite sign at the surface of the chamber. This charge is created by the current flowing from inside to outside which can be easily measured by a charge measurement circuit. Generally, the dispenser and hence the nozzle will be maintained at a relatively high voltage, and the shield and chamber connected to ground potential, as will be described hereinafter, the charge can be measured without catching the droplet in the pail. Thus charged droplets will progress through the induced charge detector which is effectively the function of the Faraday Pail.

Test No. 6

Faraday Pail is at ground potential

Dispensing tip is at the potential 2 KV to 4 KV.

Distance to Faraday Pail is 17 mm

Rest of dispensing assembly as Test No. 1.

Activation Phases

| | |
|---|---|
| Phase 1 | 0.2 ms |
| Phase 2 | 0.3 ms |
| Phase 3 | 0.3 ms |
| Phase 4 | 105 ms |

Figure 25:
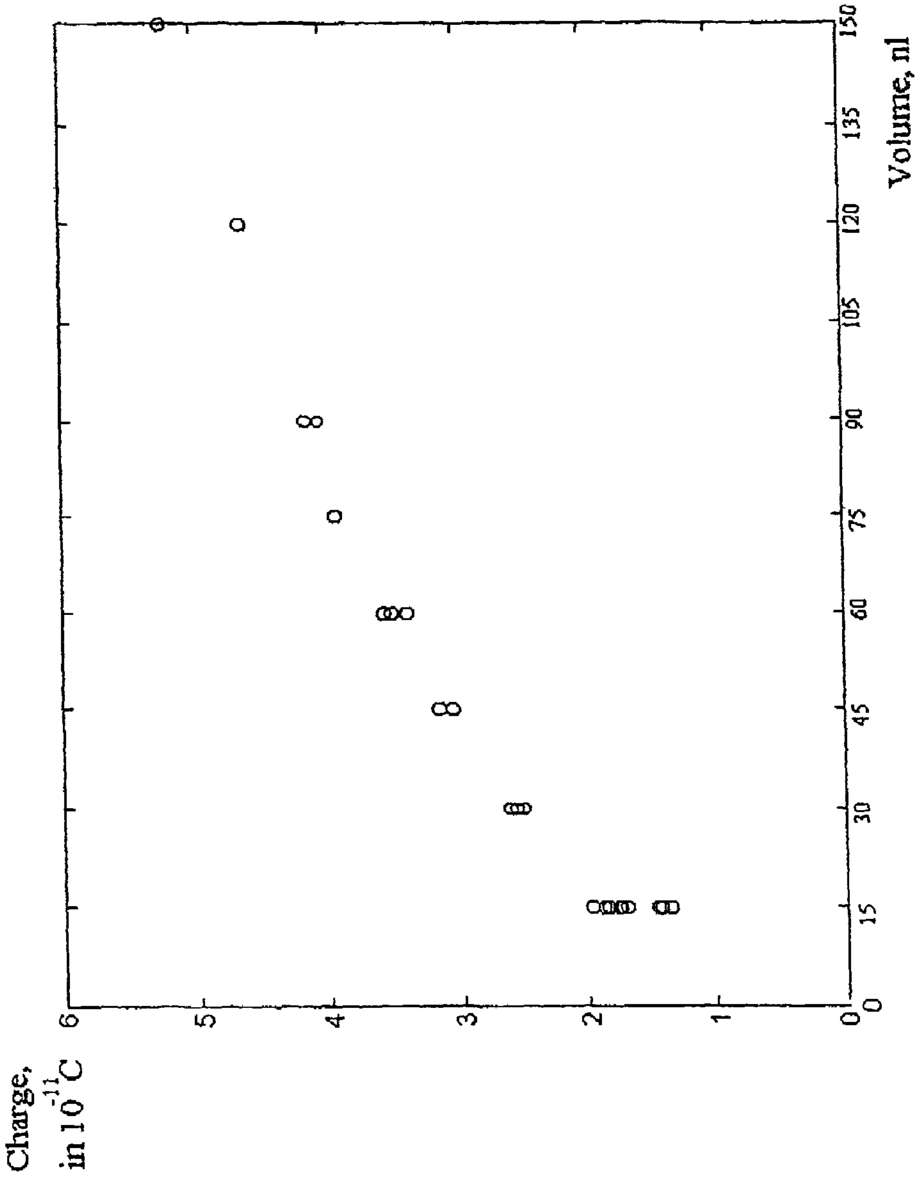

FIG. 25 illustrates that the charge is directly related to the volume of the droplet.

Test No. 7

A further test was carried out without the use of the pail at ground potential All the conditions remain the same as in Test No.6.

Figure 26:
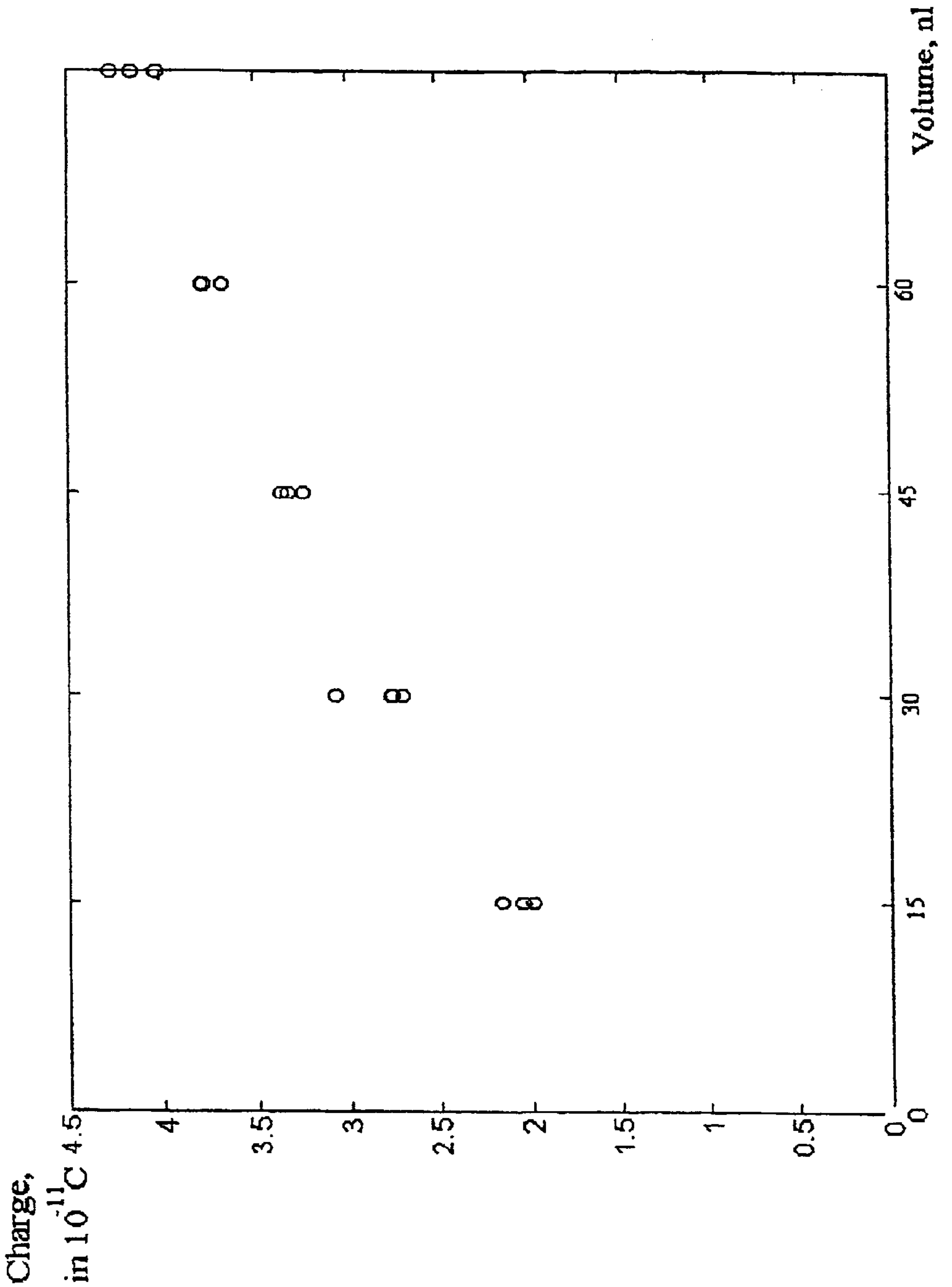
FIG. 26 records a similar test to that of FIG. 25 under different conditions.

FIG. 26 shows the results obtained from this test again the charge is directly related to the volume of the droplet.

Figure 27:
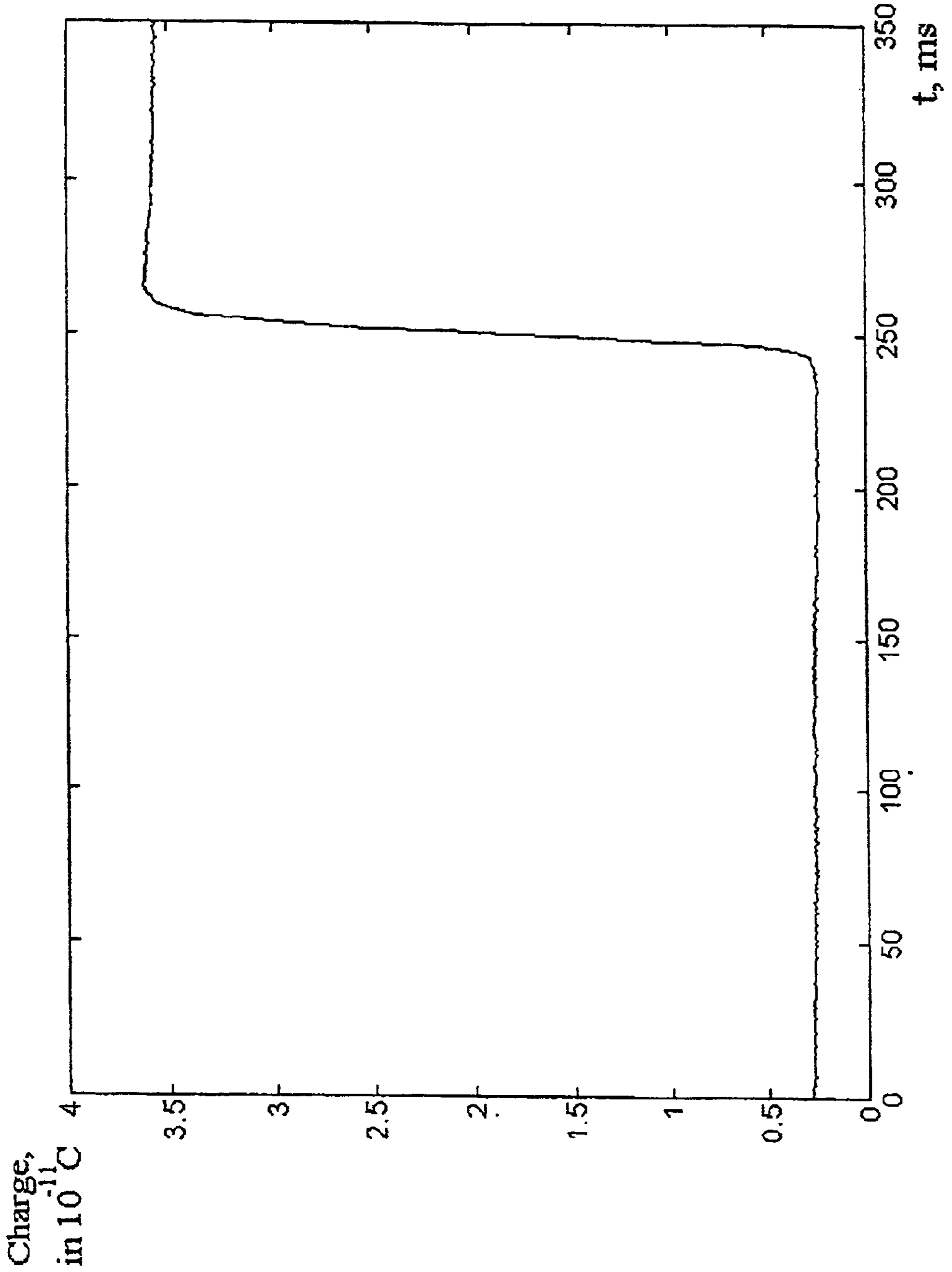
FIG. 27 shows the effect in a Faraday Pail of a droplet.
Figure 28:
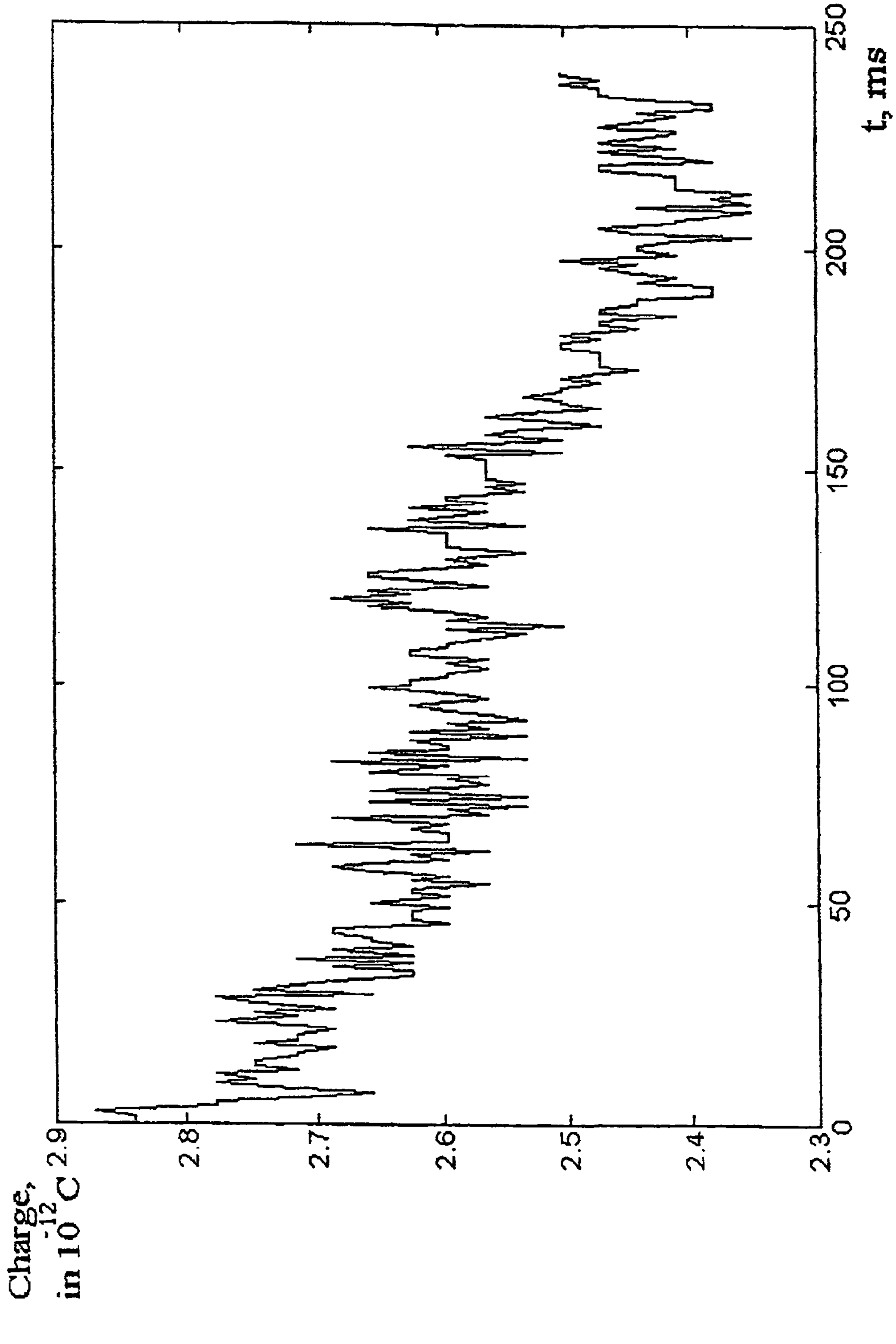
FIG. 28 illustrates graphically the noise and sensitivity of one dispensing assembly.

Referring now to FIGS. 27 and 28 there is shown typical signal detection traces from the Faraday Pail. In FIG. 27 there is shown a change in the output voltage of a charge amplified as a result of the charge of approximately $3*10^{-11}$C and it is easy to calculate the volume of the drop from the calibration curve of FIGS. 25, 26.

FIG. 28 shows the zoom in to indicate the extent of the noise and sensitivity of the system.

Figure 29:
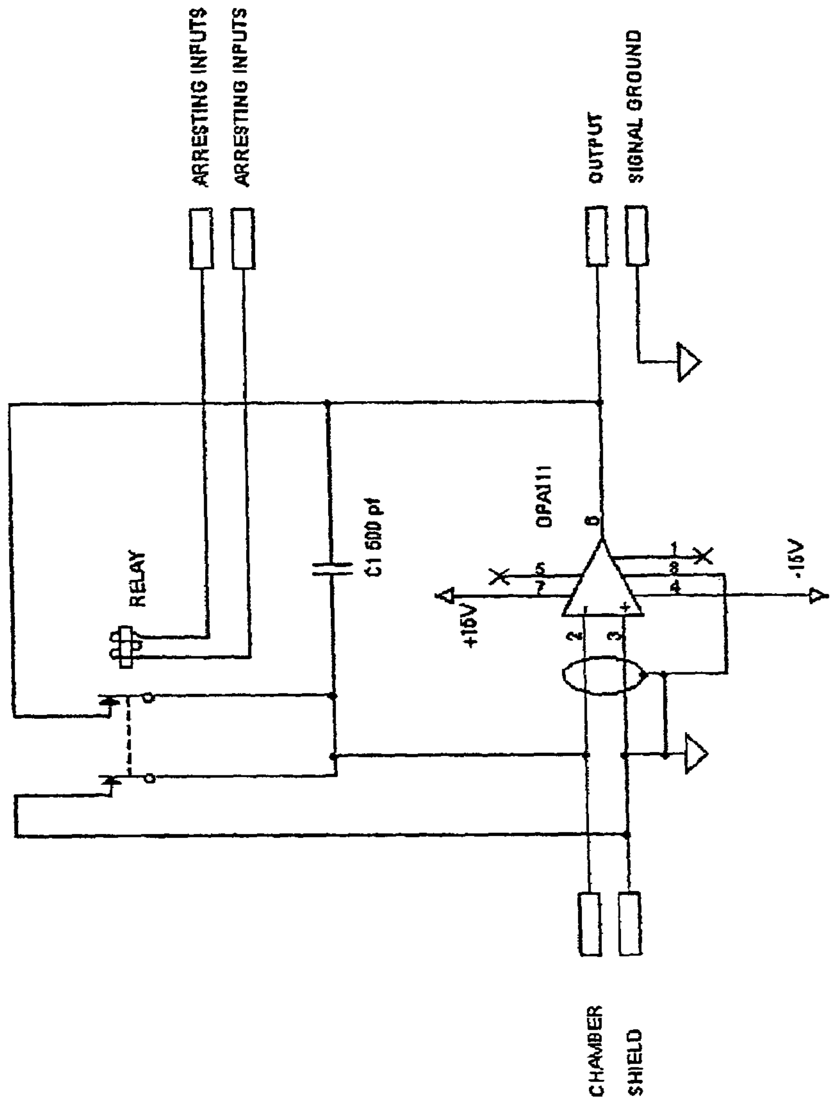
FIG. 29 illustrates an electronic circuit used with a Faraday Pail according to the invention.

Referring now the FIG. 29 there is illustrated the electronic circuit of the amplifier measuring the charge in the Faraday Pail. The two inputs of the amplifier are connected to the chamber and the shield of the Faraday Pail, respectively. The relay is added to the circuit to prevent damage to the amplifier by electrostatic charge when the circuit is idle. By deactivating relay the two inputs are connected together and they are also connected to the output voltage of OPA111 to bypass the storage capacitor C1. It is advantageous to have the storage capacitor C1 having a value of capacitance much greater than the capacitance between the chamber and the shield of the Faraday Pail.

Figure 30:
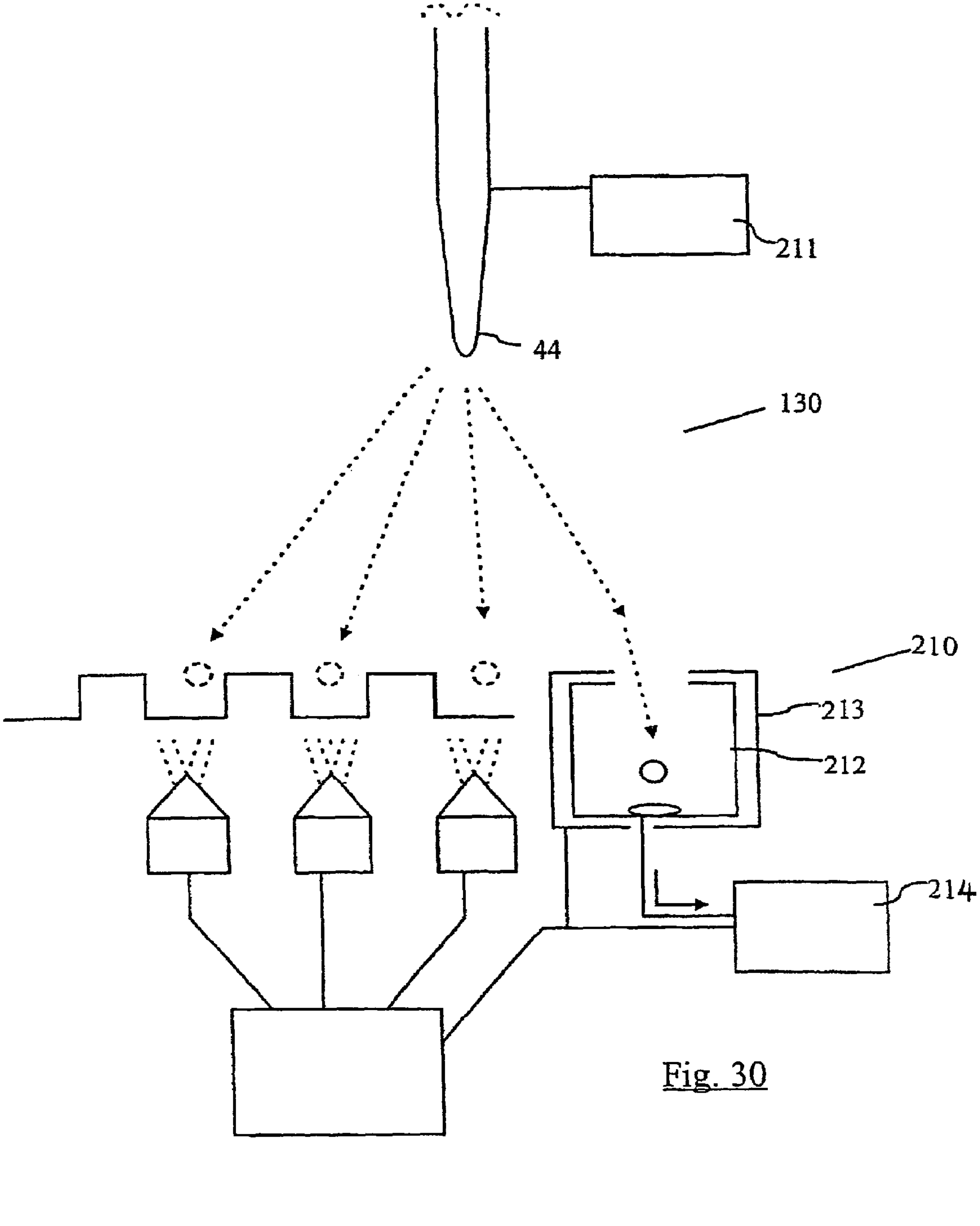
FIG. 30 is a diagrammatic view of one form of application of Faraday Pail.

Referring now to FIG. 30 there is illustrated the use of a Faraday Pail indicated generally by the reference numeral 210 for use in a dispensing assembly similar to that described with reference to the FIG. 10 above. In this embodiment a high voltage source 211 is connected to the nozzle 44. The Faraday Pail 210 comprises of an inner chamber 212 and an outer shield 213 connected to a controller 214 in the form of a charge amplifier. In use samples of droplets are taken and an average for droplet volume and mass is calculated.

To measure some parameters of a dispensed droplet (charge, mass) a contactless method is implemented. This method is based on the Faraday Pail principle.

In a conventional Faraday Pail as described in the disclosure a droplet reaches the bottom of the inner chamber and sticks to it. An output signal of the charge amplifier will be a step-like function. The height of the step indicates the value of the arrived charge.

It is important to emphasise that it is not necessary for the droplet to contact the inner chamber at all. The charge measured can be created by induction. Putting the charge inside the Faraday Pail induces charge on the inner chamber, and removing the charge from it cancels the induced charge.

When the droplet passes the bottomless Faraday Pail, the charge amplifier will create only a short pulse at its output. The rising edge of this pulse will correspond to the arrival of the charge in the chamber while a falling edge corresponds to the charge leaving.

The width of this pulse is proportional to the time of the droplet flight through the pail and therefore inversely proportional to the speed of droplet.

The height of the pulse peak is proportional to the charge of droplet.

From these parameters we can obtain value of the droplet's charge on the flight as well as the speed of the droplet accelerated by electric field after it left the tip.

Information about the voltage between the tip and the Pail, charge and speed of droplet provides an estimate of the charge-to-mass ratio for the flying droplet. Droplets with different charge to mass ratios will have different acceleration and final speed in viscos air, which can be detected by the pail. This means that charge-to-mass ratio can be estimated if the applied voltage and the final speed of droplet are both known. Dividing the droplet charge by its charge-to-mass ratio gives mass of droplet. The speed of the droplet and the calculation of its mass from the calculated charge to mass ratio can be achieved.

Figure 31:
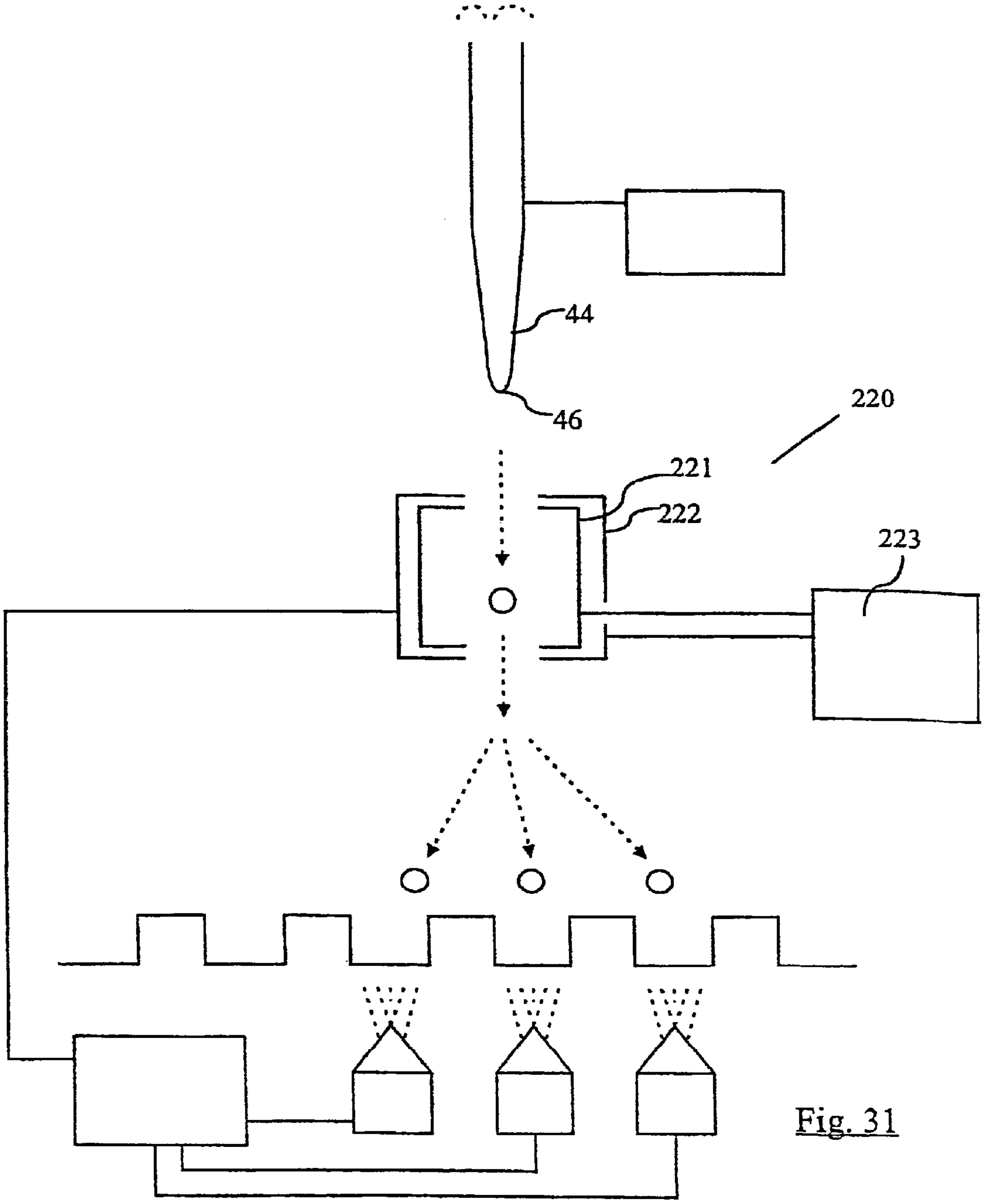
FIG. 31 is a diagrammatic view of another alternative form of application of Faraday Pail.

Referring now to FIG. 31 there is illustrated a further construction of Faraday Pail indicated generally by the reference numeral 220 having an inner chamber 221 an outer shield 222 and a charge amplifier circuit forming a controller 223.

In this embodiment the drop off voltage is determined by the potential difference between the shield 222 and the dispensing tip 46 of the nozzle 44.

While in the embodiments above and particularly in the embodiments of FIGS. 9 to 21, where various assemblies according to the invention have been illustrated, which assemblies have used dispensers substantially similar to the dispensers described with reference to FIGS. 1 to 8 inclusive and also could be used with the dispensers subsequently described herein, it will be appreciated that the dispensing assemblies could use conventional solenoid valves instead of the solenoid valves described herein. However, since such conventional solenoid valves are well known and have been described extensively in the various literature and patent specifications referred to herein, they are not described in any more detail. However, it is to be understood and appreciated that, in particular in relation to the embodiments of FIGS. 9 to 31 inclusive, a conventional solenoid valve could be substituted for the dispenser described.

Figure 32:
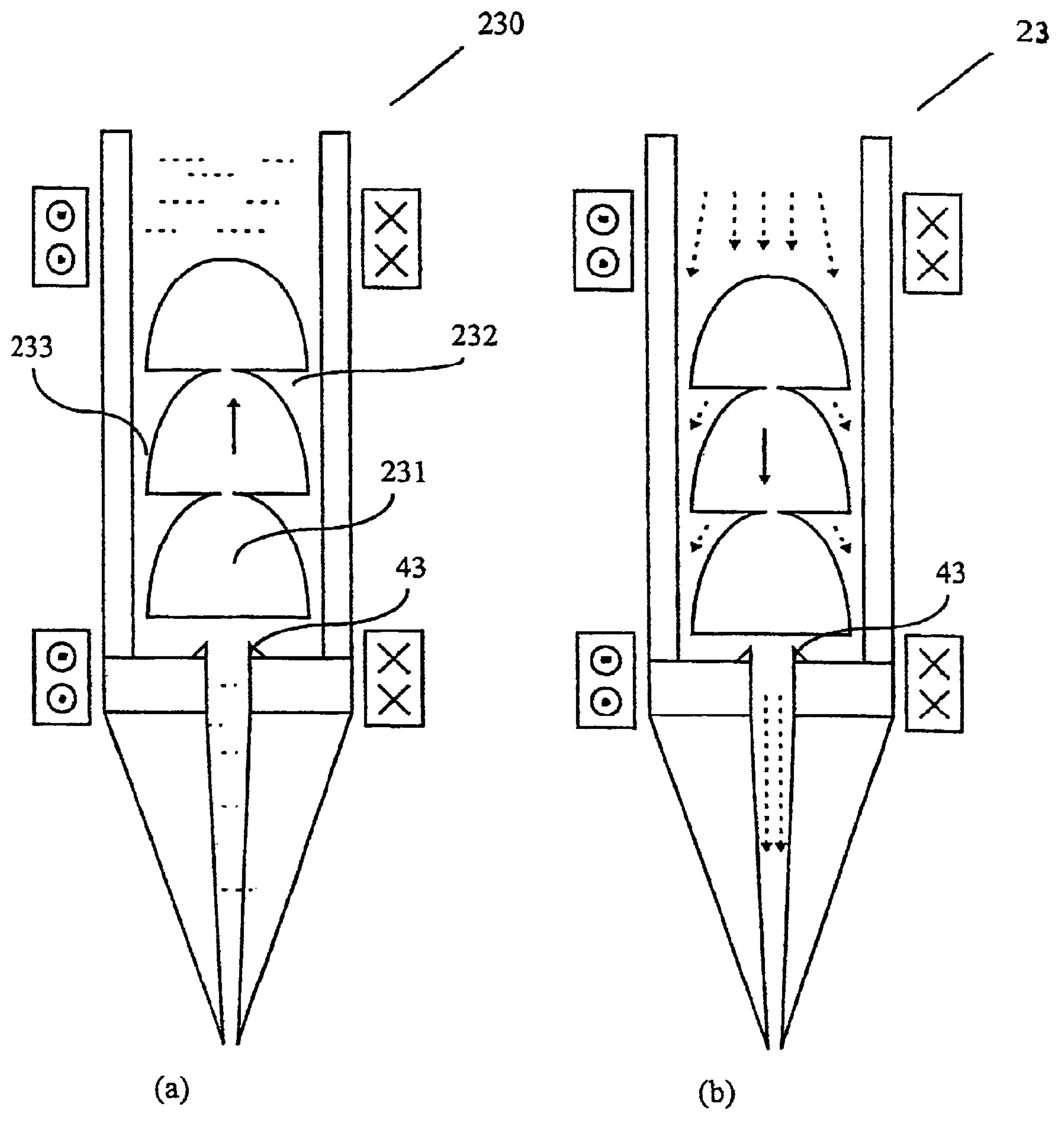
FIGS. 32(*a*) and (*b*) illustrate an alternative construction of dispenser.

Referring now to FIGS. 32(*a*) and 32(*b*), there is illustrated an alternative construction of dispenser indicated generally by the reference numeral 230 substantially similar to the dispenser illustrated with reference a to FIG. 6 and thus the same parts are identified by the same reference numerals. In this embodiment there is illustrated a valve boss 231 still of substantially axially symmetrical shape having a plurality of circumferentially arranged cut-out slots 232 forming circumferentially arranged fins 233. As can be seen in use the fins operate to force the liquid down towards the valve seat 43

Referring to FIGS. 33 to 35 inclusive there is illustrated an alternative construction dispenser indicated generally by the reference numeral 240 substantially similar to the dispenser 70 illustrated in FIG. 5 and thus the same reference numerals are used to identify the same or similar parts.

In this embodiment there is provided a spherical valve boss 241 of a soft magnetic material. The dispenser 41 is mounted between an upper coil 242 and a lower coil 243, each wrapped around a core of soft magnetic material 244 and 245 respectively. This construction is particularly advantageous in that it allows removing the dispenser 41 while keeping the source of the gradient magnetic field in place. This is particularly advantageous for replacing contaminated dispensers.

Referring now to FIGS. 36-38 inclusive there is illustrated an alternative construction of dispenser indicated generally by the reference numeral 250 in which parts similar to those described with reference to FIGS. 33 to 35 inclusive are identified by the same reference numerals.

In this embodiment there is provided a separate valve boss actuating assembly indicated generally by the reference numeral 251. In this embodiment the dispenser 250 incorporates a spherical valve boss 252 of a soft magnetic material. The actuating assembly 251 comprises a permanent magnet 253 mounted in a nozzle embracing U shaped sleeve 254 movable up and down relative to the body member 41 by a pneumatic ram of which only a plunger 255 is shown connected to the sleeve 254.

Preferably the dispenser in so far as it comprises the elongate body member the valve seat and nozzle can be manufactured from a suitable polymer material by micro machining or indeed any standard polymer mass production technique such as injection moulding. The purpose of this is to provide a disposable dispenser. The body of the dispenser could be also manufactured of other materials such as steel.

The valve boss as will be appreciated from the description above can be cylindrical, spherical or indeed a body of any geometric shape made from magnetic material for example iron, ferrite or NdFeB. It is preferably coated with a polymer or inert layer of another material to prevent chemical reaction between the boss and the liquid dispensed. In order to obtain a good seal with the valve seat, the valve boss may need to be coated with a specially selected soft polymer such as chemically inert rubber. The choice of the materials for the coating or the boss depends on the requirements of the liquids which must be handled by the dispenser. The most likely materials include fluoroelastomers such as VITON, perfluoroelastomers such as KALREZ and ZALAK and for less demanding applications, materials with lower cost could be considered such as NITRILE. TEFLON (PTFE) could be used in conjunction with chemically aggressive liquids. VITON, KALREZ, TEFLON and ZALAK are Du Pont registered trademarks.

The valve boss may be made of magnetic material bonded in a flexible polymer. These materials can have either hard or soft magnetic properties as required. The specific choice of material will be determined by the cost-performance considerations. Materials of families FX, FXSC, FXND manufactured by Kane Magnetics are suitable. Other materials such as magnetic rubbers can be also used. Making the boss of a mechanically soft material can improve the performance of the seal.

It is envisaged that the dispenser may be operational in either active or passive mode. In the active mode the valve is actuated to make an open-close circuit for each dispensation and aspiration. In this mode the dispenser is connected to a vacuum/pressure alignment as for example illustrated in FIG. 2 above. In the passive mode the dispenser is connected to a syringe pump as illustrated in FIG. 4.

It is important to note that in a preferred embodiment according to the invention, the valve boss is made of hard magnetic material, i.e. a material having a well-defined direction of magnetisation even in the absence of any external magnetic field. In a conventional solenoid valve, the plunger is usually made of soft magnetic material such as iron or iron-nickel alloy. This material has no significant magnetisation in the absence of an external magnetic field. In a preferred configuration the valve boss is a cylinder with the axisymmectrical magnetisation for instance In direction along its axis. The dispenser could also operate with a boss of soft magnetic material. However, its performance has been found to be not as good for dispensing the minute volumes such as 100 nl and smaller, because the force which can be exerted on the valve boss by a current coil is much smaller. A smaller force means that the valve boss moves slowly and the accuracy of the dispensing is reduced. Also, by using a boss of hard magnetic material it is possible to avoid the use of two coils and to use only one. In order to close the valve all that is required is to reverse the direction of the current in the coil. If the boss is made of a soft magnetic material then two coils needs to be used; one to open the valve and the other to close it.

In practice, with the present invention the dispenser can dispense volumes as small as 50 nl without any electrostatic field if the pressure in the line is as high as 10 Bar. It is often advantageous to decrease the pressure in the line connected to the dispenser. The dispensing assembly operating at a low pressure has considerable advantages. The connection requirements for the pneumatic components are less stringent. Normally it is desirable to use a basic push-fit connector in robotic dispensers for these applications. The invention when used at reduced pressures allows using a simple push-fit connection between the dispenser and the pressure line, which is a desirable feature of the dispenser.

Further at lower pressures the drops are ejected with a lower speed which reduces the chances of splashing as the drop touches the substrate or the well plate. High pressure in the line may result in gases dissolved in the liquids dispensed. This is not acceptable for many biological applications. The gas dissolved in the liquid dispensed can also result in small air bubbles at the nozzle, which make its operation unreliable.

However, reducing pressure in the line compromises the ability of the dispenser to dispense small drops. The drops grow on the nozzle tip but do not get detached from it and electrostatic drop off is required.

Essentially, the technique comprises firstly opening the valve of the dispenser to allow a droplet of the desired size to grow on the dispensing tip. The valve is then closed and subsequently a strong electrostatic field is generated between the dispensing tip and the substrate on which the droplet is to be deposited. As the value of the field increases from the initial zero to a final preset value at some stage it will exceed a critical value which will cause the drop off of the droplet.

The dispenser can also be used with the valve continuously open. In this case the fluid from the dispensing tip is ejected as a jet. The flow of the jet is determined by the pressure in the line connected to the dispenser and where present the value of the electrostatic field at the nozzle. The jet may split into droplets partly due to the electrostatic repulsion between the charged parts of the jet.

With a further miniaturisation of the substrate targets, it becomes increasingly difficult to ensure that the drop reaches the correct destination as it is ejected from a liquid handling system. For applications such as high-density arrays, the size between the subsequent drops covering the substrate, herein called pitch could be as small as 0.1 mm. In this invention there are two different means of controlling the destination of the drop, both are based on the electrostatic forces acting on the drop as it travels between the nozzle and the well.

The first way is to generate the electrostatic field with a small charged receiving electrode positioned underneath the well instead of a large conducting plate. The size of the electrode is smaller than the size of the well for accurate navigation. It may be advantageous as described above to have the receiving electrode in the shape of a tip to produce the strongest electric field at the centre of a destination well. The electrode produces a strong electric field underneath the well attracting the drop to the required destination position (usually the centre of the well). The receiving electrode may be attached to an arm of a positioner capable of moving it underneath the well plate and pointing to the correct destination well. Alternatively, the sample well plate may be repositioned above the receiving electrode in order to target a different well. It may be necessary to move the dispensing tip and receiving electrode synchronously. It may be advantageous to have a module with a number of receiving electrodes which could be connected to the high voltage supply independently. The distance between the electrodes could be the same as the distance between the centres of the wells in a well plate. In this case the drops could be navigated to different wells without actually moving the dispenser or the receiving electrode.

In an arrangement described above deflection electrodes are positioned along the path between the nozzle and the destination well. The electrodes are charged by means of a high voltage applied to them. As the drops leaving the dispensing tip are charged by the voltage between the dispensing tip and the receiving electrode, they will be deflected by the deflection electrodes.

It is important to realise that during the electrostatic drop off, the electrostatic force acting on the drop could much greater than the gravity force. In this case as the drop flies between the nozzle and the substrate, the direction of the path is determined by the direction of the electrostatic field.

While it is explained above in many instances necessary to calibrate the dispenser for each new liquid because the volume dispensed depends on the properties of the liquid and of the nozzle, in certain instances this is not required as has been explained above.

In the present invention we also envisage, as described above, the monitoring of the droplet in flight. It is important in many instances to be absolutely certain that the droplet was actually dispensed and ideally also to ascertain the volume of the droplet and this has been described in considerable detail above. Also it must be noted that the present invention proposes a method for the direct measurements of volume of the droplet which is not based on the detection or the timing of the drop-off but on direct measurement of the charge on the droplet.

It has been found particularly advantageous to separate the actuation of the dispenser into distinct phases. The first phase is accelerating the valve boss fast from the initial position when the valve is closed by sending a short pulse of a large current through the coil or coils. In the case of one dispenser manufactured in accordance with the invention, the duration of the first phase is typically in the range of 0.2 to 0.5 ms. The second phase is maintaining the valve in the open position and during this phase, the current in the coil is considerably reduced. The duration of the second phase mainly determines the volume of the droplet dispensed as demonstrated above. In dispensing assemblies manufactured in accordance with the present invention the duration of the second phase of some 0.1 to 5 ms would result in the volume of the droplets dispensed being in the range of 100 nl to some few microliters. The third phase is closing the valve with a short pulse of a high current. In the case of a specific dispenser constructed the duration of the third phase was typically in the range of some 0.2 to 0.4 ms. The fourth phase is maintaining the valve in the closed position, i.e. holding the boss against the seal for the duration between cycles. The value of the current during the fourth phase was typically in the range of some 20% of the peak current supplied through the coil/coils during the first and third phases. Such a separation is advantageous as it allows getting the highest value of the actuating force from the coil or coils. Driving a large current through a coil or coils over an extended length of time may cause overheating with a detrimental effect. However, during a short pulse, a much higher current value is acceptable. A much higher current resulting in much higher actuating force is particularly suitable for dispensing of droplets of submicroliter volumes.

A similar separation into separate phases can be advantageous during the aspiration of the liquids.

It will also be appreciated in accordance with the present invention that it does not rely on a positive displacement pump nor indeed does it rely on the conventional normal construction of solenoid valve. At the same time the present invention can, as shown above, be applied with advantage to positive displacement pump assemblies. The essential point then is that the positive displacement pump operates as a source of pressure difference, not as a metering device. There is no mechanical connection between the valve boss and other parts of the dispenser, similarly there is no mechanically actuated means involved on a spring for closing a valve boss. There is virtually zero dead volume in the apparatus according to the present invention which increases the accuracy particularly where smaller volumes are required. By having the dispenser separate from the actuating coils etc., it is possible to produce a very low cost dispenser which can be easily and rapidly removed thus avoiding cost and cross contamination problems. There is thus great disposability with the present invention. It is also advantageous that the present invention can work at both high and low pressures.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the claims.

The invention claimed is:

1. A dispenser for discrete droplets of less than ten microliters (10 μl) in volume of a liquid comprising:

(A) a main assembly;

(B) a liquid container comprising:

an elongated body member having a straight main bore;

an inlet to the main bore;

a valve seat in the body member forming a main bore outlet remote from and substantially in line with the inlet;

a nozzle mounted on the body member and having a nozzle bore communicating with the valve seat;

a droplet dispensing tip on the nozzle remote from the valve seat;

a separate elongated floating valve boss of magnetic material loosely mounted in the main bore for limited movement out of line with the main bore, its cross-sectional area relative to that of the main bore being such as to permit the free flow of liquid between the main bore inlet and outlet by passing the valve boss, said valve boss not being mechanically connected to the body member;

(C) means for releasably securing the liquid container to the main assembly;

(D) means for exerting a pressure differential on the liquid in the dispenser; and (E) a separate valve boss actuating assembly adjacent the body member for applying an electromagnetic force to the valve boss to engage and disengage the valve boss from the valve seat.

2. A dispensing assembly as claimed in claim 1 in which the valve boss is of a hard magnetic material.

3. A dispensing assembly as claimed in claim 1 in which the valve boss is covered with a layer of soft polymer.

4. A dispensing assembly as claimed in claim 1 in which the valve boss is manufactured from a flexible polymer bonded magnetic material.

5. A dispensing assemble as claimed in claim 1 in which the valve boss actuating assembly is an electrical coil surrounding the body member.

6. A dispensing assembly as claimed in claim 1 in which the valve actuating assembly comprises two separate sets of coils for moving the valve boss in opposite directions within the body member of the liquid container.

7. A dispensing assembly as claimed in claim 1 in which the valve actuating assembly comprises two separate coils for moving the valve boss in opposite directions within the body member of the liquid container, a source of electrical power and a controller for varying the current over time as each droplet is being dispensed.

8. A dispensing assembly as claimed in claim 1 in which the valve actuating assembly comprises a permanent magnet and means for moving the magnet along the body member of the liquid container towards and away from the valve seat.

9. A dispensing assembly as claimed in claim 1 in which the valve boss actuating assembly comprises a permanent magnet substantially U shaped to embrace the body member and means for moving the magnet along the body member of liquid container towards and away from the valve seat.

10. A dispensing assembly as claimed in claim 1 in which valve actuating assembly comprises a pair of spaced apart magnetizing assemblies each comprising a coil wrapped around a core of soft magnetic material.

11. A dispensing assembly as claimed in claim 1 in which the valve actuating assembly comprises a pair of spaced-apart magnetizing assemblies each comprising a coil wrapped around a substantially U-shaped core for embracing the body member.

12. A dispensing assembly as claimed in claim 1 in which the valve boss comprises a cylindrical plug having radially extending circumferential fins whereby movement of the boss towards the valve seat liquid is urged into the nozzle bore and onto the tip.

13. A dispensing assembly as claimed in claim 1 in which the body member and the nozzle form an integral moulding of plastics material.

14. A dispensing assembly as claimed in claim 1 in which the body member and nozzle are made from metal.

15. A dispensing assembly as claimed in claim 1 comprising:

an electrode incorporated in the dispensing tip;

a separate receiving electrode remote from the tip; and a high voltage generating means connected to one of the electrodes to provide an electrostatic field therebetween.

16. A dispensing assembly as claimed in claim 1 comprising:

an electrode incorporated in the dispensing tip;

a separate receiving electrode below the tip; and a high voltage generating means connected to one of the electrodes to provide an electrostatic field therebetween.

17. A dispensing assembly as claimed in claim 1 comprising:

an electrode incorporated in the dispensing tip;

a separate receiving electrode remote from the tip;

a high voltage generating means connected to one of the electrodes to provide an electrostatic field therebetween; and a droplet receiving substrate mounted between the receiving electrode and the dispenser tip.

18. A dispensing assembly as claimed in claim 1 comprising:

an electrode incorporated in the dispensing tip;

a separate receiving electrode remote from the tip including a hole for the passage of a droplet therethrough;

a droplet receiving substrate mounted below the receiving electrode; and a high voltage generating means connected to one of the electrodes to provide an electrostatic field therebetween.

19. A dispensing assembly as claimed in claim 1 comprising:

an electrode incorporated in the dispensing tip;

a plurality of separate receiving electrodes remote from the tip each having a hole for the passage of a droplet therethrough;

a droplet receiving substrate mounted below the receiving electrodes;

means for activating the receiving electrodes separately; and a high voltage generating means connected to one of the electrodes to provide an electrostatic field therebetween.

20. A dispensing assembly as claimed in claim 1 comprising:

an electrode incorporated in the dispensing tip;

a separate receiving electrode remote from the tip;

a droplet receiving substrate mounted below the receiving electrode;

a high voltage generating means connected to one of the electrodes to provide an electrostatic field therebetween; and synchronous indenting means for the dispenser and the receiving electrode for accurate deployment of droplets on the substrate.

21. A dispensing assembly as claimed in claim 1 comprising:

an electrode incorporated in the dispensing tip;

a plurality of separate receiving electrodes forming droplet deflection electrodes remote from the tip;

a droplet receiving substrate mounted below the deflection electrodes;

a high voltage generating means connected to one of the deflection electrodes to provide an electrostatic field therebetween; and control means to vary the voltage applied to the deflection electrodes.

22. A dispensing assembly as claimed in claim 1 comprising a detector for sensing the separation of the droplet from the dispensing tip.

23. A dispensing assembly as claimed in claim 1 comprising a detector for sensing the separation of the droplet from the dispensing tip, the detector comprising:

a source of electromagnetic radiation;

means for focussing the radiation on the end of the dispensing tip; and means for collecting the radiation coupled by a droplet on the dispensing tip.

24. A dispensing assembly as claimed in claim 1, comprising a detector for sensing the separation of the droplet from the dispensing tip, the detector comprising:

a source of electromagnetic radiation mounted within the dispenser nozzle;

means for focussing the radiation on the end of the dispensing tip; and means for collecting the radiation coupled by a droplet on the dispensing tip.

25. A dispensing assembly as claimed in claim 1 in which means are provided for measuring the charge of the droplet.

26. A dispensing assembly as claimed in claim 1 in which a Faraday Pail is provided for measuring the charge of the droplet.

27. A dispensing assembly as claimed in claim 1 in which a bottomless Faraday Pail is provided for measuring the charge of the droplet.

28. A dispenser for discrete droplets of less than ten microliters (10 μl) in volume of a liquid comprising:

(A) a main assembly;

(B) a liquid container comprising:

an elongated body member having a straight main bore;

an inlet to the main bore;

a valve seat in the body member forming a main bore outlet remote from and substantially in line with the inlet;

a nozzle mounted on the body member and having a nozzle bore communicating with the valve seat;

a droplet dispensing tip on the nozzle remote from the valve seat;

a separate elongated floating valve boss of hard magnetic material magnetised along its longitudinal axis loosely mounted in the main bore for limited movement out of line with the main bore, its cross-sectional area relative to that of the main bore being such as to permit the free flow of liquid between the main bore inlet and outlet by passing the valve boss, said valve boss not being mechanically connected to the body member;

(C) means for releasably securing the liquid container to the main assembly;

(D) means for exerting a pressure differential on the liquid in the dispenser;

(E) a separate valve boss actuating assembly adjacent the body member for applying an electromagnetic force to the valve boss to engage and disengage the valve boss from the valve seat;

(F) an electrode incorporated in the dispensing tip;

(G) a separate receiving electrode remote from the tip; and (H) a high voltage generating means generating means connected to one of the electrodes to provide an electrostatic field therebetween.

29. A dispensing assembly as claimed in claim 28 in which the valve boss is biased to a closed position into engagement with the valve seat by an external magnetic field generated by the actuating coil assembly.

30. A dispensing assembly as claimed in claim 28 in which the valve actuating assembly comprises two separate coils for moving the valve boss in opposite directions within the body member of the liquid container, a source of electrical power and a controller for varying the current over time as each droplet is being dispensed.

31. A dispensing assembly as claimed in claim 28 in which the body member and the nozzle form an integral moulding of plastics material.

32. A dispensing assembly as claimed in claim 28 comprising:

an electrode incorporated in the dispensing tip;

a separate receiving electrode remote from the tip; and a high voltage generating means connected to one of the electrodes to provide an electrostatic field therebetween.

33. A dispensing assembly as claimed in claim 28 in which the receiving electrode is below the dispensing tip.

34. A dispensing assembly as claimed in claim 28 comprising a droplet receiving substrate mounted between the receiving electrode and the dispenser tip.

35. A dispensing assembly as claimed in claim 28 in which a droplet receiving substrate is mounted below the receiving electrode, the receiving electrode having at least one opening for the droplet to pass through to the receiving substrate.

36. A dispensing assembly as claimed in claim 28 in which there is a plurality of receiving electrodes at least one of which is activated at any time.

37. A dispensing assembly as claimed in claim 28, in which a droplet receiving substrate is mounted below a plurality of receiving electrodes, each of the receiving electrodes having at least one opening for the droplet to pass through to the receiving substrate.

38. A dispensing assembly as claimed in claim 28, in which a droplet receiving substrate is mounted below the receiving electrodes, the receiving electrodes having at least one opening for the droplet to pass through to the receiving substrate and in which synchronous indexing means are provided for the dispenser and the receiving electrode for accurate deployment of droplets on the substrate.

39. A dispensing assembly as claimed in claim 28, in which there is more than one receiving electrode forming droplet deflection electrodes which are mounted below the dispensing tip to provide a component of the electrostatic field substantially parallel to the receiving substrate and in which the high voltage generating means has control means to vary the voltage applied to the deflection electrodes.

40. A dispensing assembly as claimed in claim 28 comprising a detector for sensing the separation of the droplet from the dispensing tip.

41. A dispensing assembly as claimed in claim 28 comprising a detector for sensing the separation of the droplet from the dispensing tip, the detector comprising:

a source of electromagnetic radiation;

means for focussing the radiation on the end of the dispensing tip; and means for collecting the radiation coupled by a droplet on the dispensing tip.

42. A dispensing assembly as claimed in claim 28, comprising a detector for sensing the separation of the droplet from the dispensing tip, the detector comprising:

a source of electromagnetic radiation mounted within the dispenser nozzle;

means for focussing the radiation on the end of the dispensing tip; and means for collecting the radiation coupled by a droplet on the dispensing tip.

43. A dispensing assembly as claimed in claim 28 comprising a detector for sensing the separation of the droplet from the dispensing tip, the detector comprising:

a source of electromagnetic radiation;

means for focussing the radiation on the end of the dispensing tip; and means for collecting the radiation coupled by a droplet on the dispensing tip.

44. A dispensing assembly as claimed in claim 28 in which means are provided for measuring the charge of the droplet.

45. A dispensing assembly as claimed in claim 28 in which a Faraday Pail is provided for measuring the charge of the droplet.

46. A dispensing assembly as claimed in claim 28 in which a bottomless Faraday Pail is provided for measuring the charge of the droplet.

47. A dispenser for discrete droplets of less than ten microliters (10 μl) in volume of a liquid comprising:

(A) a main assembly;

(B) a liquid container comprising:

an elongated body member having a straight main bore;

an inlet to the main bore;

a valve seat in the body member forming a main bore outlet remote from and substantially in line with the inlet;

a nozzle mounted on the body member and having a nozzle bore communicating with the valve seat;

a droplet dispensing tip on the nozzle remote from the valve seat;

a separate elongated floating valve boss of hard magnetic material magnetised along its longitudinal axis loosely mounted in the main bore for limited movement out of line with the main bore, its cross-sectional area relative to that of the main bore being such as to permit the free flow of liquid between the main bore inlet and outlet by passing the valve boss, said valve boss not being mechanically connected to the body member;

(C) means for releasably securing the liquid container to the main assembly;

(D) means for exerting a pressure differential on the liquid in the dispenser;

(E) a separate valve boss actuating assembly adjacent the body member for applying an electromagnetic force to the valve boss to engage and disengage the valve boss from the valve seat;

(F) an electrode incorporated in the dispensing tip;

(G) a separate receiving electrode below from the tip;

(H) a high voltage generating means connected to one of the electrodes with the other electrodes maintained at a different voltage to provide an electrostatic field therebetween; and (I) means are provided for measuring the charge of the droplet.

48. A dispensing assembly as claimed in claim 47 in which a droplet receiving substrate is mounted below the receiving electrode, the receiving electrode having at least one opening for the droplet to pass through to the receiving substrate.

49. A dispensing assembly as claimed in claim 47, in which a droplet receiving substrate is mounted below the receiving electrodes, the receiving electrodes having at least one opening for the droplet to pass through to the receiving substrate and in which synchronous indexing means are provided for the dispenser and the receiving electrode for accurate deployment of droplets on the substrate.

50. A dispenser for discrete droplets of less than ten microliters (10 μl) in volume of a liquid comprising:

(A) a main assembly;

(B) a liquid containe an elongated body member having a straight main bore;

an inlet to the main bore;

a valve seat in the body member forming a main bore outlet remote from and substantially in line with the inlet;

a nozzle mounted on the body member and having a nozzle bore communicating with the valve seat;

a droplet dispensing tip on the nozzle remote from the valve seat;

a separate elongated floating valve boss of magnetic material loosely mounted in the main bore for limited movement out of line with the main bore, its cross-sectional area relative to that of the main bore being such as to permit the free flow of liquid between the main bore inlet and outlet by passing the valve boss, said valve boss not being mechanically connected to the body member;

(C) means for releasably securing the liquid container to the main assembly;

(D) means for exerting a pressure differential on the liquid in the dispenser;

(E) a separate valve boss actuating assembly adjacent the body member for applying an electromagnetic force to the valve boss to engage and disengage the valve boss from the valve seat;

(F) an electrode incorporated in the dispensing tip;

(G) a separate receiving electrode below the tip;

(H) a high voltage generating means connected to one of the electrodes to provide an electrostatic field therebetween; and (I) means are provided for measuring the charge of the droplet.

51. A dispensing assembly as claimed in claim 50 in which a Faraday Pail is provided for measuring the charge of the droplet.

52. A dispensing assembly as claimed in claim 50 in which a bottomless Faraday Pail is provided for measuring the charge of the droplet.

* * * * *